US010176492B2

(12) United States Patent
Kitagawa et al.

(10) Patent No.: US 10,176,492 B2
(45) Date of Patent: Jan. 8, 2019

(54) INFORMATION PROCESSING APPARATUS AND INFORMATION PROCESSING SYSTEM TO DISPLAY INFORMATION BASED ON STATUS OF APPLICATION

(75) Inventors: Tomoyuki Kitagawa, Kanagawa (JP); Kenji Ozawa, Chiba (JP); Pieter Coenen, Lier (BE)

(73) Assignee: SONY CORPORATION, Tokyo (JP)

( * ) Notice: Subject to any disclaimer, the term of this patent is extended or adjusted under 35 U.S.C. 154(b) by 847 days.

(21) Appl. No.: 12/852,127

(22) Filed: Aug. 6, 2010

(65) Prior Publication Data

US 2011/0055007 A1 Mar. 3, 2011

(30) Foreign Application Priority Data

Aug. 31, 2009 (JP) ................................ 2009-200757

(51) Int. Cl.
*G06Q 30/00* (2012.01)
*G06F 3/048* (2013.01)
(Continued)

(52) U.S. Cl.
CPC ......... *G06Q 30/0251* (2013.01); *G06F 9/451* (2018.02)

(58) Field of Classification Search
CPC ............................ G06Q 30/0251; G06F 9/451
(Continued)

(56) References Cited

U.S. PATENT DOCUMENTS 8,259,118 B2 * 9/2012 Roseborough .......... G06T 13/80 345/441
2006/0041843 A1 * 2/2006 Billsus .................. G06Q 30/02 715/714
(Continued)

FOREIGN PATENT DOCUMENTS

JP 2007-207153 8/2007
JP 2008-15595 1/2008

OTHER PUBLICATIONS www.michigan.gov/documents/QVF4_157572_7.pdf, "Chapter 14—Internet Exploere/Outlook Express", Apr. 2006, pp. 14-1 through 14-2.*
(Continued)

*Primary Examiner* — John Van Bramer
(74) *Attorney, Agent, or Firm* — Chip Law Group

(57) ABSTRACT

There is provided an apparatus including: a preference information generation unit for generating preference information; a status determination unit for determining a status of an operation application based on a change in the status of the operation application having a first status for displaying a first operation screen on which registered applications can be selectively executed and a second status for displaying a second operation screen on which display information attracting a user is selectively displayed; a display control unit for selectively displaying the first operation screen and the second operation screen on a display screen based on a determination result; a display information displaying control unit for displaying the display information on the second operation screen based on a determination result; and a processing unit for performing a processing corresponding to an application selected on the first operation screen or display information selected on the second operation screen.

16 Claims, 13 Drawing Sheets

B
C
A'

(51) Int. Cl.
*G06Q 30/02* (2012.01)
*G06F 9/451* (2018.01)

(58) Field of Classification Search
USPC .............................. 705/14.49; 715/835, 765
See application file for complete search history.

(56) References Cited

U.S. PATENT DOCUMENTS

| | | | |
|---|---|---|---|
| 2008/0000344 | A1 | 1/2008 | Komori et al. |
| 2009/0271496 | A1 | 10/2009 | Nakamura et al. |

OTHER PUBLICATIONS

ACM (Java Task Force Tutorial Chapter 3, "Animation and Iteractivity", http://cs.stanford.edu/people/eroberts/jtf/tutorial/index.html & http://cs.stanford.edu/people/eroberts/jtf/tutorial/AnimationAndInteractivity.html), Aug. 25, 2006, pp. 1-20.* www.michigan.gov/documents/QVF4_157572_7.pdf, "Chapter 14—Internet Explorer/Outlook Express", Apr. 2006, pp. 14-1 through 14-2 (Year: 2006).*

ACM, Java Task Force Turtorial Chapter 3, cs.stanford.edu/people/eroberts/ftf/tutorial/AnimationAndInteractivity.hmtl, Aug. 25, 2006, pp. 1-20 (Year: 2006).*

* cited by examiner

A

L

A

P

INFORMATION PROCESSING APPARATUS AND INFORMATION PROCESSING SYSTEM TO DISPLAY INFORMATION BASED ON STATUS OF APPLICATION

BACKGROUND OF THE INVENTION

Field of the Invention

The present invention relates to an information processing apparatus, a program and an information processing system.

Description of the Related Art

In recent years, there has been developed a technique that analyzes a user's preference and provides information based on the analysis result to the user thereby to provide user-desired information. Further, in recent years, there has been developed a technique that selects information such as advertisement to be provided to a user and provides the selected information to the user based on the information on the user such as information (such as information indicating a machine type) on a kind of a user's information processing apparatus or information indicating a user-present area.

There are listed, for example, Japanese Patent Application Laid-Open No. 2008-15595 and Japanese Patent Application Laid-Open No. 2007-207153 as a technique that provides information based on an analysis result of a user's preference.

SUMMARY OF THE INVENTION

A related art that provides information based on an analysis result of a user's preference (which may be referred to as "related technique" below) is used thereby to realize an information processing system that notifies information of the user (provides information) or retrieves information to be notified, for example. However, in the related technique, applications directed for information notification (client applications) are preset and contents to be retrieved are limited. Thus, when the related technique is used, as far as the user does not use the target applications, a user's preference may not be analyzed with higher accuracy and the user-desired information may not be provided. Thus, even if the information for recommending the contents of advertisement information, music or images (animations/still images) for the user is provided to the user by the related technique, the user may not be attracted by the contents indicated by the information.

When the related technique is used, the processings to be performed on user's actions for the provided information are limited to the "processings capable of being realized within the target applications". Thus, even if the related technique is used, user's convenience is not necessarily improved when the user is attracted by the provided information.

Therefore, it may not be possible to provide the information capable of attracting the user matching with the user's preference to the user and thereby to improve user's convenience when the user is attracted by the provided information even if the related technique is used.

In light of the foregoing, it is desirable to provide a novel and improved information processing apparatus, program and information processing system capable of providing information capable of attracting a user to the user and improving user's convenience when the user is attracted by the provided information.

According to an embodiment of the present invention, there is provided an information processing apparatus including a preference information generation unit for analyzing a user's preference based on a user's operation and generating preference information indicating the user's preference, a status determination unit for detecting, based on a user's operation, a change in status of an operation application having a first status for displaying a first operation screen on which applications are registered and the registered applications can be selectively executed through a user's selecting operation and a second status for displaying a second operation screen on which the first operation screen is hidden and display information acquired based on the preference information, which enables a user's selecting operation and attracts the user, is selectively displayed, and determining the status of the operation application, a display control unit for selectively displaying the first operation screen and the second operation screen on a display screen based on a determination result of the status determination unit, a display information displaying control unit for displaying the display information on the second operation screen based on a determination result of the status determination unit, and a processing unit for, when an application is selected on the first operation screen or the display information is selected on the second operation screen, performing a processing corresponding to the selected application or the selected display information.

In such an arrangement, it is possible to provide to a user information capable of attracting the user and thereby to improve user's convenience when the user is attracted by the provided information.

The display control unit may display the second operation screen having a predetermined shape, when the distance between a user's operation position and the second operation screen on the display screen is equal to or less than a predetermined distance, may deform the predetermined shape to a shape depending on the operation position, and when the distance between the user's operation position and the second operation screen is larger than the predetermined distance, may elastically restore the deformed predetermined shape to the pre-deformed predetermined shape.

The display control unit may display the first operation screen on which the registered applications are displayed in image and a display line which deforms depending on a user's operation position on the display screen is displayed under the image, when the distance between the operation position and the image is equal to or less than a predetermined distance, may deform the part immediately under the image in the display line to be larger than the distance relative to the operation position, and when the distance between the operation position and the image is larger than the predetermined distance, may elastically restore the shape of the deformed display line to the shape of the pre-deformed display line.

The display control unit may display the second operation screen constituting part of the first operation screen.

The operation application may be a launcher application for selectively executing one or more applications.

The information processing apparatus may further include a storage unit for storing therein preference information generated by the preference information generation unit, advertisement information and content data, and a display information acquisition unit for generating the display information matching with the preference information based on the preference information, the advertisement information and the content data stored in the storage unit. The display information displaying control unit may display the display information generated in the display information acquisition unit on the second operation screen.

The information processing apparatus may further include a communication unit communicable with an information providing server for generating display information matching with the preference information. The display information acquisition unit may transmit the preference information generated by the preference information generation unit to the information providing server and acquires display information matching with the transmitted preference information from the information providing server, and the display information displaying control unit may display the display information generated in the display information acquisition unit or the display information acquired by the display information acquisition unit from the information providing server on the second operation screen.

The information processing apparatus may further include a communication unit communicable to an information providing server for generating display information matching with the preference information, and a display information acquisition unit for transmitting the preference information generated by the preference information generation unit to the information providing server and acquiring display information matching with the transmitted preference information from the information providing server. The display information displaying control unit may display the display information acquired in the display information acquisition unit on the second operation screen.

According to another embodiment of the present invention, there is provided an information processing apparatus including a preference information generation unit for analyzing a user's preference and generating preference information indicating the user's preference, an operation application status control unit for controlling, based on a user's operation, a status of an operation application having a first status for displaying a first operation screen on which applications can be selectively executed through a user's selecting operation and a second status for displaying a second operation screen on which the first operation screen is hidden and recommend information acquired based on the preference information is displayed, a recommend information displaying control unit for, when the status of the operation application is the second status, selectively displaying the recommend information on the second operation screen, and a processing unit for, when an application is selected on the first operation screen or the recommend information is selected on the second operation screen, performing a processing corresponding to the selected application or the selected recommend information.

In such an arrangement, it is possible to provide to a user information capable of attracting the user and thereby to improve user's convenience when the user is attracted by the provided information.

The information processing apparatus may include a display control unit for displaying the second operation screen having a predetermined shape, and a pointer displaying control unit for displaying a pointer moving in response to a user's operation. The display control unit may deform the second operation screen having the predetermined shape depending on the position of the pointer when the pointer approaches the second operation screen.

The display control unit may change the display position of the second operation screen along with the movement of the pointer when the pointer approaches the second operation screen.

According to another embodiment of the present invention, there is provided a program for causing a computer to function as means for analyzing a user's preference based on a user's operation and generating preference information indicating the user's preference, means for detecting, based on a user's operation, a change in status of an operation application having a first status for displaying a first operation screen on which applications are registered and the registered applications can be selectively executed through a user's selecting operation and a second status for displaying a second operation screen on which the first operation screen is hidden and display information acquired based on the preference information, which enables a user's selecting operation and attracts the user, is displayed, and determining the status of the operation application, means for selectively displaying the first operation screen and the second operation screen on a display screen based on a determination result of the determination means, means for displaying the display information on the second operation screen based on a determination result of the determination means, and means for, when an application is selected on the first operation screen or the display information is selected on the second operation screen, performing a processing corresponding to the selected application or the selected display information.

By use of such a program, it is possible to provide to a user information capable of attracting the user and thereby to improve user's convenience when the user is attracted by the provided information.

According to another embodiment of the present invention, there is provided an information processing system including an information processing apparatus, and an information providing server communicable to the information processing apparatus. The information processing apparatus includes an apparatus side communication unit communicable to an external device, a preference information generation unit for analyzing a user's preference based on a user's operation and generating preference information indicating the user's preference, a storage unit for storing therein the preference information generated by the preference information generation unit, advertisement information and content data, a status determination unit for detecting, based on a user's operation, a change in status of an operation application having a first status for displaying a first operation screen on which applications are registered and the registered applications can be selectively executed via a user's selecting operation and a second status for displaying a second operation screen on which the first operation screen is hidden and display information acquired based on the preference information, which enables a user's selecting operation and attracts the user, is displayed, and determining the status of the operation application, a display control unit for selectively displaying the first operation screen and the second operation screen on a display screen based on a determination result of the status determination unit, a display information acquisition unit for generating the display information matching with the preference information, and/or transmitting the preference information generated by the preference information generation unit to the information providing server and acquiring the display information matching with the transmitted preference information from the information providing server based on the preference information, the advertisement information and the content data stored in the storage unit, a display information displaying control unit for displaying the display information generated in the display information acquisition unit or the display information acquired by the display information acquisition unit from the information providing server on the second operation screen based on a determination result of the status determination unit, and a processing unit for, when an application is selected on the first operation screen or the display information is selected on the second operation screen, performing a processing corresponding to the selected application or the selected display information, and the information providing server includes a server side communication unit communicable to an external device, and a display information generation unit for generating display information matching with the preference information based on the preference information transmitted from the information processing apparatus, which has been received by the server side communication unit, and transmitting the generated display information to the information processing apparatus which has transmitted the preference information.

In such an arrangement, there is provided an information processing system operable to provide to a user information capable of attracting the user and thereby to improve user's convenience when the user is attracted by the provided information.

According to the present invention, it is possible to provide to a user information capable of attracting the user and thereby to improve user's convenience when the user is attracted by the provided information.

DETAILED DESCRIPTION OF THE EMBODIMENT(S)

Figure 1:
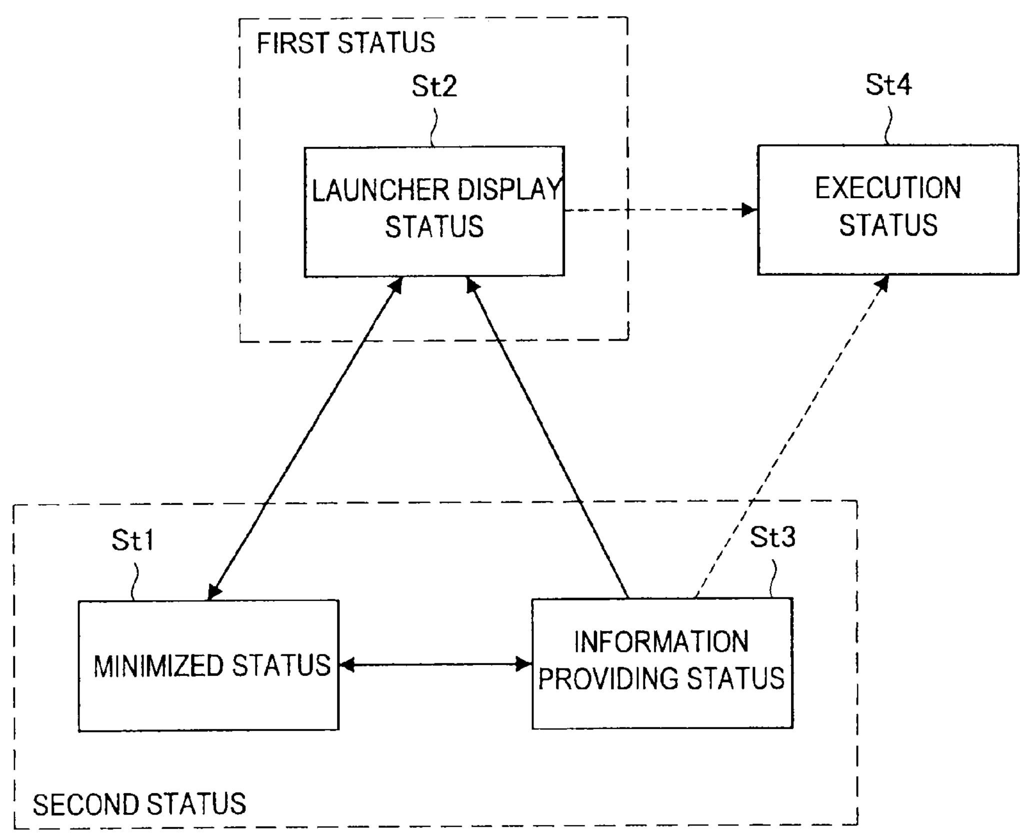
FIG. 1 is an explanation diagram for explaining a display status in an information processing apparatus according to an embodiment of the present invention.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

The following explanation will be made in the order described below:

1. Approach according to the embodiment of the present invention

2. Information processing system according to the embodiment of the present invention 3. Program according to the embodiment of the present invention (Approach According to the Embodiment of the Present Invention)

A convenience improving approach according to an embodiment of the present invention will be described before explaining a configuration of each apparatus constituting an information processing system according to the embodiment of the present invention (which may be referred to as "information processing system 1000" below).

[Outline of Convenience Improving Approach]

User-desired information may not necessarily be provided when information is provided to a user depending on a specific application or information to be provided is retrieved as in a related technique. An information processing apparatus according to the embodiment of the present invention (which may be collectively referred to as "information processing apparatus 100" below) provides information to the user of the information processing apparatus 100 via an operation application for selectively executing a registered application in the information processing system 1000. The user of the information processing apparatus 100 will be simply indicated as "user" below.

More specifically, the information processing apparatus 100 provides information (display information) to the user via an operation application having a first status for displaying a first operation screen on which registered applications can be selectively executed and a second status for displaying a second operation screen on which the first operation screen is hidden and the display information is selectively displayed. The first operation screen and the second operation screen constituting the operation application according to the embodiment of the present invention will be described later.

The display information according to the embodiment of the present invention is to be displayed on the display screen on which the user can perform a selecting operation, in which the processings to be performed when being selected by the user are defined. The display information according to the embodiment of the present invention is configured with the following parameters or data, for example. Of course, the display information according to the embodiment of the present invention may not necessarily be configured with the following parameters or data.

<Configuration Example of Display Information>

- Image data clearly indicating a kind of message to be displayed on display screen
- Parameters indicating contents of message to be displayed on display screen
- Parameters indicating processing contents to be executed when message to be displayed on display screen is selected The processing contents which are indicated by the parameters indicating the above executed processing contents constituting the display information include but are not limited to, for example, executing a browser (one example of application) to display a specific website or executing the browser to download data from a specific server. For example, the information processing apparatus 100 can display the display information for executing an audio data reproducing application to reproduce predetermined audio data or the display information for displaying unread news in a RSS (Resource description framework Site Summary) feed.

The parameters indicating the above executed processing contents, which constitute the display information, include but are not limited to a parameter indicating an application to be executed, a parameter indicating a processing to be executed by the application, a processing parameter to be used in the processing, and the like.

More specifically, the display information according to the embodiment of the present invention includes the following items of information, for example.

<Examples of Display Information>

- Unread news in RSS (Resource description framework Site Summary) feed subscribed by user (or based on user's preference)
- Information on content data such as audio data or image data stored in information processing apparatus 100 and platform (application) for reproducing the content data, which are retrieved (or extracted) based on preference information indicating user's preference
- Information on contents over cloud computing service, which is retrieved from network such as Internet based on preference information The information based on the preference information among the examples of the above display information corresponds to the information (recommend information) which is recommended to the user based on the user's preference by the information processing apparatus 100. In the following, the information to be recommended to the user based on, for example, the above preference information among the display information according to the embodiment of the present invention may be referred to as "recommend information".

The display information according to the embodiment of the present invention is not limited to the information based on the user's preference as described above. For example, the information processing apparatus 100 can display the information which is not necessarily based on the user's preference as the display information as described below. Of course, a specific server shown in the following example can use the preference information acquired from the information processing apparatus 100 to distribute an advertisement message based on the user's preference.

<Other Examples of Display Information>

- Messages (such as advertisement message) which a specific server distributes to a user based on identification information (such as machine type information) for identifying the information processing apparatus 100 or area information indicating the area where the information processing apparatus 100 is positioned, or information linked to the messages (such as link information to content data over network, or instructions for executing a predetermined application)
- Information associated with information analyzed by application being executed in the information processing apparatus 100

The information processing apparatus 100 can use, for example, SKU (Stock Keeping Unit) information, user management information in which information on the user is recorded, or information acquired from GPS (Global Positioning System) to acquire the area information, but is not limited thereto.

The information associated with the information analyzed by the above application includes a message to be presented to the user and the processing contents corresponding to the message. The message to be presented to the user includes but is not limited to a message indicating an operation desirable for the user or a message indicating an alert such as hardware abnormality. Further, the processing contents corresponding to the message include execution of a predetermined application such as scan disk (for example, when an abnormality in a storage unit (described later) provided in the information processing apparatus 100 is detected). In the following, the information associated with the information analyzed by the above application, which is provided to the user by the information processing apparatus 100, may be referred to as "application message".

The information processing apparatus 100 selectively displays the above display information on the second operation screen, for example. Of course, the display information according to the embodiment of the present invention is not limited to the above.

The information processing apparatus 100 acquires the display information based on the preference information indicating a user's preference, for example. The acquisition of the display information according to the embodiment of the present invention means that the information processing apparatus 100 generates the display information based on the preference information and/or acquires the display information generated by an external device based on the preference information from the external device. The external device includes an information providing server constituting the information processing system 1000 (which may be referred to as "information providing server 200" below).

The information processing apparatus 100 uses a technique capable of analyzing a user's preference, for example, software such as preference analyzing engine, to perform user's preference analysis, thereby generating the preference information.

More specifically, the information processing apparatus 100 can generate the preference information by analyzing a user's behavior based on a user's operation or analyzing information such as frequently-executed application among the applications registered in the operation application, for example. The information processing apparatus 100 can analyze the user's behavior based on the user's operations in association with the information on time for which the user's operation is performed. In the above case, the information processing apparatus 100 can provide the display information to the user at a more suitable timing based on the user's behavior history.

The information processing apparatus 100 can generate the preference information in association with an external device communicable via a network such as Internet. More specifically, the information processing apparatus 100 extracts information such as frequently-reproduced singer's name (artist name) from the user's audio file reproducing history and acquires meta information corresponding to the extracted information from the external device. Then, the information processing apparatus 100 associates the extracted information with the acquired meta information to analyze a user's potential preference in association with other users having the similar preference, thereby assuming the analysis result as the preference information.

Further, when the display information displayed on the second operation screen is selected, the information processing apparatus 100 can use the selecting history for user's preference analysis. As described above, the history of selecting the display information displayed on the second operation screen is used for the user's preference analysis, so that the information processing apparatus 100 can display new display information based on the user's history of selecting the display information. Thus, the more the time passes, the more the information processing apparatus 100 can provide display information with higher accuracy to the user according to the user's preference. In other words, the information processing apparatus 100 uses the display information selecting history for user's preference analysis to generate the preference information and displays the display information based on the preference information, so that the information processing apparatus 100 can provide the display information to the user while having a so-called learning function.

The operation application according to the embodiment of the present invention includes a launcher application capable of selectively executing one or more registered applications based on the user's selecting operation (one example of the user's operation), for example. In the following, the operation application according to the embodiment of the present invention will be described by way of example of a palette-type launcher application. Of course, the operation application according to the embodiment of the present invention is not limited to the palette-type launcher application.

The operation application such as launcher application is directed for selectively executing a registered application and thus can be executed at any time. The operation application according to the embodiment of the present invention can have several applications registered therein, and thus is not limited to one specific application unlike the related technique. Therefore, the information processing apparatus 100 provides the information to the user via the operation application according to the embodiment of the present invention, thereby avoiding the dependence on a specific application as in the related technique.

Thus, since the information processing apparatus 100 can analyze the user's preference with higher accuracy than an information processing apparatus in related art using the related technique, it can provide the user-desired display information to the user as compared with the case where the related technique is used to provide the information.

When the display information is selected via the user's operation (such as click operation or touch operation) (that is, when the user is attracted by the provided display information), the information processing apparatus 100 performs a processing based on the processing contents defined in the display information.

The display information according to the embodiment of the present invention is dynamically-generated information which is based on the preference information or is not necessarily based on the preference information like the application message, for example. Thus, the information processing apparatus 100 can more flexibly perform the processing when the user is attracted by the provided display information than the information processing apparatus in related art using the related technique.

Therefore, the information processing apparatus 100 can improve user's convenience when the user is attracted by the display information (provided display information) displayed on the second operation screen.

As described above, the information processing apparatus 100 using the convenience improving approach according to the embodiment of the present invention provides the display information to the user via the operation application for displaying the first operation screen and the second operation screen on the display screen. Thus, the information processing apparatus 100 can provide the information capable of attracting the user to the user and improve the user's convenience when the user is attracted by the provided information.

[One Example of Display Screen to be Displayed by Information Processing Apparatus 100]

Next, one example of the display screen to be displayed by the information processing apparatus 100 for the aforementioned convenience improving approach will be described. In the following, the processings in the information processing apparatus 100 and the information providing server 200 constituting the information processing system 1000 will be described appropriately along with one example of the display screen for the convenience improving approach.

FIG. 1 is an explanatory diagram for explaining a display status in the information processing apparatus 100 according to the embodiment of the present invention. In FIG. 1, there are shown the first status (St2 shown in FIG. 1) of the operation application according to the embodiment of the present invention, the second status (St1, St3 shown in FIG. 1) and other application's execution status (St4 shown in FIG. 1).

The information processing apparatus 100 switches the statuses St1 to St4 shown in FIG. 1 in response to the user's operation. More specifically, the information processing apparatus 100 detects a user's operation position or a user's operation such as selecting operation on the display screen based on an operation signal in response to the user's operation sent from an operation unit (described later) or an operation signal sent from an external operation device such as mouse. Then, the information processing apparatus 100 switches the status based on the detection result of the user's operation. The information processing apparatus 100 detects a change in the status of the operation application based on the user's operation and recognizes the status of the operation application, for example, so that the switching of the status based on the detection result of the user's operation in the information processing apparatus 100 is realized.

The minimized status St1, the launcher display status St2, the information providing status St3, and the execution status St4, which are shown in FIG. 1, and the transition between the statuses will be described below.

[1] Minimized Status St1

The minimized status St1 is the initial status when, for example, the operation application is activated, and serves to notify the user of the presence of the operation application. When the operation application is in the minimized status St1, the operation application serves to attract the user, that is, serves as a teaser.

Figure 2:
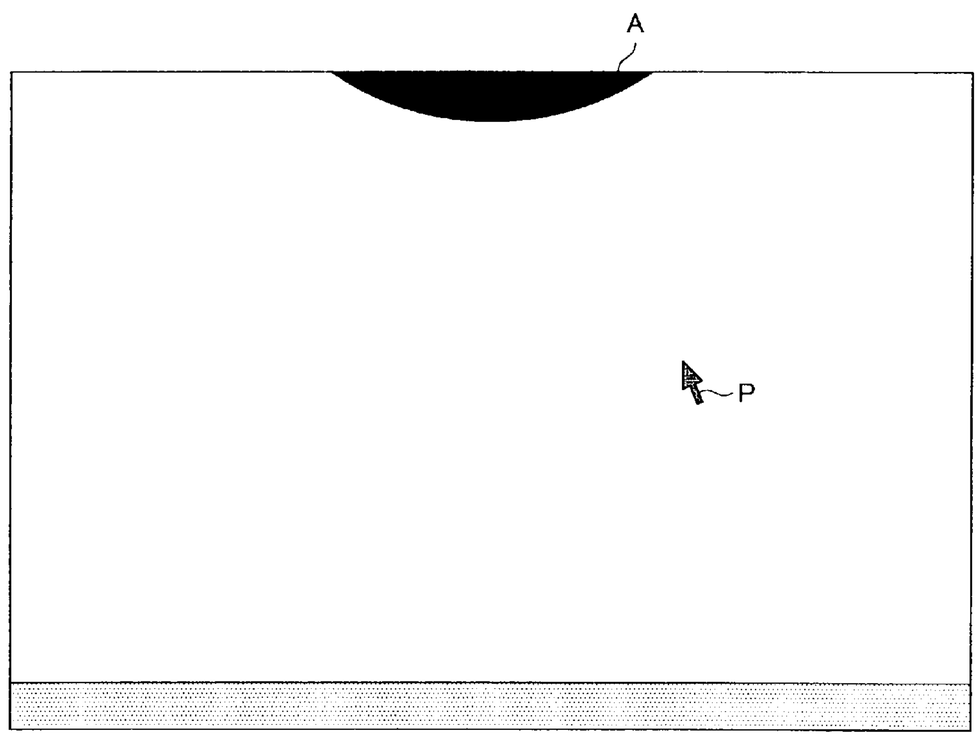
FIG. 2 is an explanatory diagram showing one example of a minimized status of an operation application to be executed by the information processing apparatus according to the embodiment of the present invention.

FIG. 2 is an explanatory diagram showing one example of the minimized status of the operation application to be executed by the information processing apparatus 100 according to the embodiment of the present invention. A shown in FIG. 2 is one example of the second operation screen of the operation application (which may be referred to as "second operation screen A" below). In FIG. 2, a pointer P is shown as an indicator for indicating the user's operation position. There will be described below, as one example, a case where the information processing apparatus 100 indicates the user's operation position with the pointer P.

The second operation screen A is displayed in a lip shape (one example of a predetermined shape) at the upper end of the display screen, for example, as shown in FIG. 1. When the operation application is activated, the information processing apparatus 100 causes the second operation screen A to fall from the uppermost portion of the display screen down to the final display position. Further, the information processing apparatus 100 causes the second operation screen A to bound several times due to inertia, for example, and to be elastically displayed at the final display position.

The second operation screen A shown in FIG. 1 has the following effects, for example.

- To indicate the presence (being activated) and position of the operation application to the user
- To enable the user to execute the selecting operation using the pointer (for example, "click operation") or the "touch operation" (when the display screen is displayed on the touch screen)

Though not shown in FIG. 2, the second operation screen A can be provided with a display area capable of displaying the display information displayed in image or text. The display area is provided in the second operation screen A and thus the information processing apparatus 100 can display various items of display information in the display area in the information providing status St3 described later.

The information processing apparatus 100 can display information in the display area of the second operation screen A also in the minimized status St1. The information to be displayed in the display area of the second operation screen A in the minimized status St1 includes the name of an operation application, for example. In the above case, the second operation screen according to the embodiment of the present invention can cause the user to recognize the operation application as "brand". Of course, the information to be displayed in the display area of the second operation screen A in the minimized status St1 by the information processing apparatus 100 according to the embodiment of the present invention is not limited to the name of an operation application.

The information processing apparatus 100 changes the lip shape of the second operation screen A based on the distance between the user's operation position and the second operation screen A.

More specifically, when the distance between the user's operation position and the second operation screen on the display screen is equal to or less than a predetermine distance, the information processing apparatus 100 changes the lip shape to a shape depending on the operation position. When the distance between the user's operation position and the second operation screen is larger than the predetermined distance, the information processing apparatus 100 elastically restores the deformed lip shape to the pre-deformed lip shape. The predetermined distance according to the embodiment of the present invention includes a distance relative to the outer periphery of the second operation screen, for example, but is not limited thereto. The predetermined distance according to the embodiment of the present invention may be a predefined distance, for example, or may be set based on the user's operation.

Figures 3A, 3B, 3C:
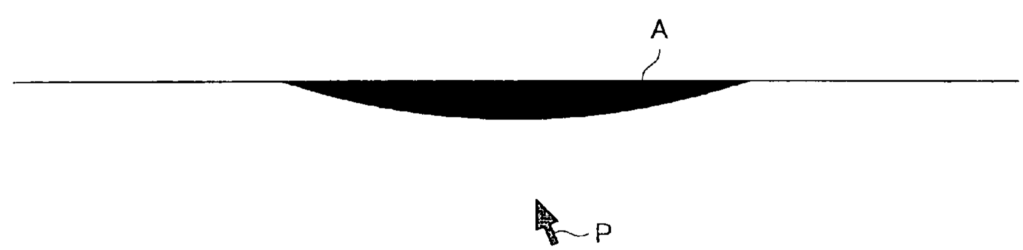
FIG. 3A is an explanatory diagram showing one example of a change in shape of a second operation screen to be displayed on a display screen by the information processing apparatus according to the embodiment of the present invention.
FIG. 3B is an explanatory diagram showing one example of a change in shape of the second operation screen to be displayed on a display screen by the information processing apparatus according to the embodiment of the present invention.
FIG. 3C is an explanatory diagram showing one example of a change in shape of the second operation screen to be displayed on a display screen by the information processing apparatus according to the embodiment of the present invention.

FIGS. 3A to 3C are explanatory diagrams showing examples of a change in the shape of the second operation screen A to be displayed on the display screen by the information processing apparatus 100 according to the embodiment of the present invention. FIG. 3A shows the lip shape (default shape) of the initial status of the second operation screen A, and FIG. 3 B shows one example of the lip shape deformed depending on the position of the pointer P (user's operation position). Further, FIG. 3C shows the lip shape elastically restored to the pre-deformed lip shape depending on the position of the pointer P (user's operation position).

When the pointer P is moved near the second operation screen (within the predetermined distance), the information processing apparatus 100 changes the lip shape as if the lip shape were drawn toward the position of the pointer P (user's operation position; which is similarly applicable below) (FIG. 3B). At this time, when a brand label indicating the name of the operation application, icon, text and the like are displayed on the second operation screen (the information providing status St3 described later is also included), the information processing apparatus 100 moves them along with the movement of the lip shape. The information processing apparatus 100 moves the above brand label, icon, text and the like along the line L1 (the imaginary line not shown) shown in FIG. 1, which directs towards the concave bottom of the lip shape, but is not limited thereto.

When the pointer P is away beyond the predetermined distance from the second operation screen, the information processing apparatus 100 restores the lip shape to the pre-deformed shape (FIG. 3). The information processing apparatus 100 causes the lip shape deformed as shown in FIG. 3B to bound several times due to inertia, for example, thereby elastically restoring the same to the original lip shape.

The information processing apparatus 100 changes the lip shape of the second operation screen A based on the distance between the user's operation position and the second operation screen A as shown in FIGS. 3A to 3C, for example. Of course, the shape of the second operation screen in the information processing apparatus 100 according to the embodiment of the present invention, and the modified examples of the shape are not limited to the above.

When the pointer P approaches the second operation screen A (when the pointer P is within the predetermined distance from the second operation screen A), for example, the information processing apparatus 100 can also change the display position of the second operation screen A depending on the movement of the pointer P. From the above, the information processing apparatus 100 can move the second operation screen A shown in FIG. 2 to the left end or right end of the uppermost part of the display screen, for example, and can move the second operation screen A to the portions other than the uppermost part of the display screen, such as a portion in the vertical direction of the display screen.

[2] Transition Between Minimized Status St1 and Launcher Display Status St2

When it is detected that the pointer P is positioned within the second operation screen A (within the lip shape) through the user's operation, the information processing apparatus 100 transits the status from the minimized status St1 to the launcher display status St2 (described later).

When it is detected that the pointer P is positioned outside the first operation screen described later after being transited to the launcher display status St2, for example, the information processing apparatus 100 transits the status from the launcher display status St2 to the minimized status St1. Thus, in the above case, the second operation screen A shown in FIG. 2, for example, is to be displayed on the display screen.

Of course, the transition between the minimized status St1 and the launcher display status St2 in the information processing apparatus 100 according to the embodiment of the present invention is not limited to the above.

[3] Launcher Display Status St2

The launcher display status St2 is the main display status of the operation application and allows selective execution of the registered applications based on the user's operation.

Figure 4:
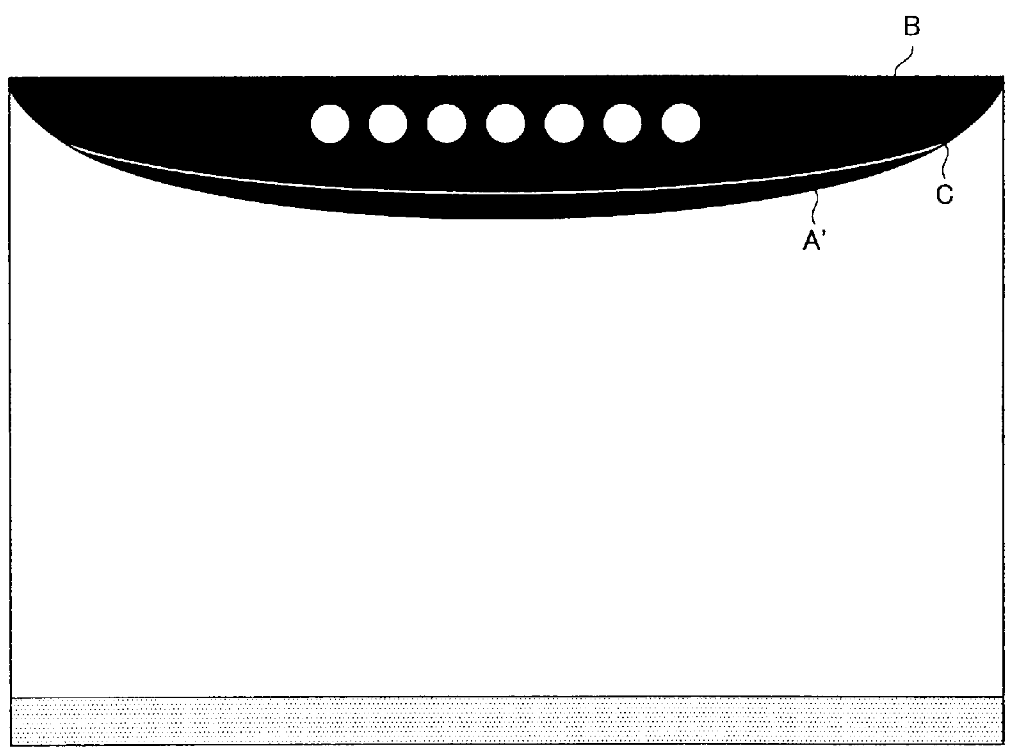
FIG. 4 is an explanatory diagram showing one example of a launcher display status of the operation application to be executed by the information processing apparatus according to the embodiment of the present invention.

FIG. 4 is an explanatory diagram showing one example of the launcher display status St2 of the operation application to be executed by the information processing apparatus 100 according to the embodiment of the present invention. B shown in FIG. 4 is one example of the first operation screen of the operation application (which may be referred to as "first operation screen B" below).

FIG. 4 shows a case where the second operation screen constitutes part of the first operation screen B. More specifically, FIG. 4 shows the first operation screen B on which a second operation screen A' corresponding to the second operation screen A shown in FIG. 2 is arranged under the display line C of FIG. 4 (which may be referred to as "display line C" below), for example. A part which functions as the launcher in the vertical direction (for example, a part over the display line C shown in FIG. 4) is defined by the display line C, for example, in the first operation screen B. Of course, the first operation screen according to the embodiment of the present invention is not limited to the example shown in FIG. 4.

The first operation screen B changes in its shape along with the movement of the pointer P similar to the lip shape of the second operation screen A shown in FIG. 2, for example.

The first operation screen B functions as a palette-type launcher in which the registered applications are displayed in image, for example. In FIG. 4, the registered applications are displayed in circles for convenience, but are not limited thereto. In the following, the applications registered in the first operation screen B are displayed in circles for convenience similar to FIG. 4. Further, in the following, the images registered in the first operation screen B are referred to as "icon". The icon according to the embodiment of the present invention is associated with a path or parameter to an execution file of a corresponding application, for example. Thus, the icon according to the embodiment of the present invention can serve to execute its corresponding application based on the user's selecting operation. Of course, the information associated with the icon according to the embodiment of the present invention is not limited to the above.

In the following, there will be described behaviors depending on a user's operation in the first operation screen B shown in FIG. 4, which is performed based on the user's operation by the information processing apparatus 100.

[3-1] First Example of Behavior of First Operation Screen B (Icon Scaling Operation)

Figure 5A:
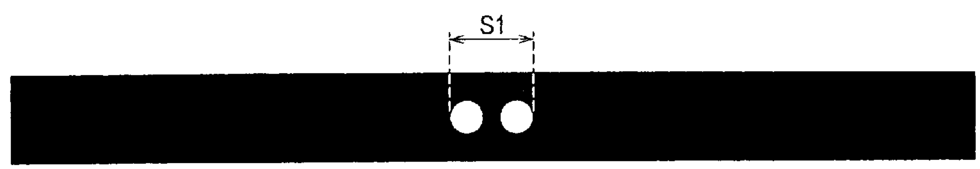
FIG. 5A is an explanatory diagram showing a first example of a behavior of a first operation screen to be displayed on the display screen by the information processing apparatus according to the embodiment of the present invention.
Figure 5B:
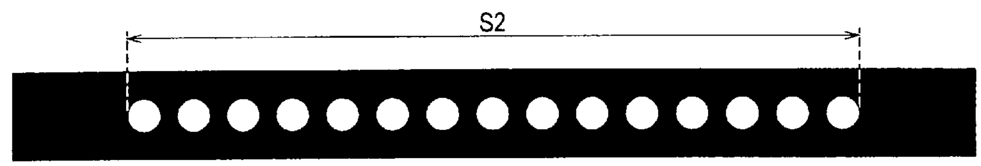
FIG. 5B is an explanatory diagram showing the first example of a behavior of the first operation screen to be displayed on the display screen by the information processing apparatus according to the embodiment of the present invention.
Figure 5C:
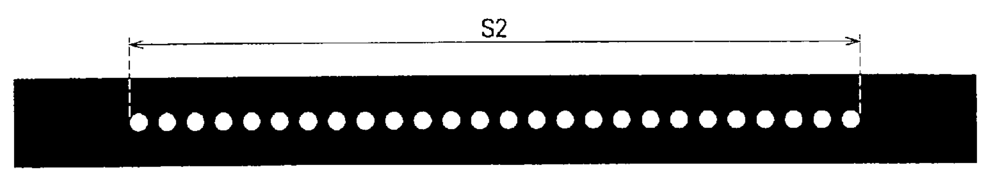
FIG. 5C is an explanatory diagram showing the first example of a behavior of the first operation screen to be displayed on the display screen by the information processing apparatus according to the embodiment of the present invention.

FIGS. 5A to 5C are explanatory diagrams showing the first example of a behavior of the first operation screen B to be displayed on the display screen by the information processing apparatus 100 according to the embodiment of the present invention. FIGS. 5A to 5C show part of the first operation screen B. S1 shown in FIG. 5A and S2 shown in FIGS. 5B and 5C indicate the launcher size in the horizontal direction, respectively.

The launcher size in the first operation screen B depends on a resolution of the display screen and an icon's default size (referred to as "default icon size" below), for example. The default icon size according to the embodiment of the present invention is derived based on the available horizontal resolution. More specifically, the information processing apparatus 100 derives the default icon size from the following formula 1, for example, but the method for deriving the default icon size according to the embodiment of the present invention is not limited to the method using the following formula 1.

Default icon size=available horizontal resolution of 3.33% (Formula 1)

The information processing apparatus 100 derives the available horizontal resolution according to the embodiment of the present invention from the following formula 2, for example. The method for deriving the available horizontal resolution according to the embodiment of the present invention is not limited to the method using the following formula 2.

Available horizontal resolution=Horizontal resolution−space occupied by side bar if any (Formula 2)

The information processing apparatus 100 derives the display size of the icon displayed on the first operation screen B as described below, for example, based on the default icon size derived from the above formulas 1 and 2.

When the number of icons displayed on the first operation screen B is equal to or less than a predetermined number (or less than the predetermined number; which is similarly applicable below), the information processing apparatus 100 assumes the icon display size as the default icon size (FIG. 5A).

The information processing apparatus 100 arranges the icons whose display sizes are derived such that the icons are at the 20th pixels from the uppermost portion of the display screen and at the center in the horizontal direction, but is not limited thereto. The information processing apparatus 100 assumes the interval between the icons to be half the display size, for example, but is not limited thereto.

As many applications as one wants can be registered on the first operation screen, but the information processing apparatus 100 limits the area in which the icons are to be displayed to the area defined in size S2 in the horizontal direction of the launcher, for example. This is a limitation to be made for better looking of the first operation screen, for example, and it is natural that the first operation screen according to the embodiment of the present invention is not necessarily limited to the area in which the icons are to be displayed.

As far as the first operation screen is not limited by the area in which the icons are to be displayed, the information processing apparatus 100 assumes the icon display size as the default icon size (FIG. 5B).

If the icons are beyond the display area limitation when being displayed in the default icon size due to an increase in the applications registered in the first operation screen, for example, the information processing apparatus 100 reduces the icon display size (FIG. 5C).

The information processing apparatus 100 assumes the icon display size as the maximum size which is not beyond the area in which the icon is to be displayed, but is not limited thereto. When the information processing apparatus 100 reduces the icon display size, the information processing apparatus 100 reduces all the displayed icons and the interval between the icons at the same reduction rate, for example. Even when the icons and the interval between the icons are reduced as described above, the information processing apparatus 100 does not change the size of the entire first operation screen B, for example.

The information processing apparatus 100 derives the icon display size as described above, for example, and displays the icons displayed in the derived display size on the first operation screen B (icon scaling display). Thus, the first operation screen B can function as the palette-type launcher.

Further, the information processing apparatus 100 derives the height (size in the vertical direction) of the part functioning as the launcher in the first operation screen B to be "40 pixels+default icon size", for example. The height derived by the default icon size indicates the part over the start point and the end point of the display line C, for example. The height of the part functioning as the launcher in the first operation screen B changes along with the shape of the display line depending on the movement of the pointer P.

The information processing apparatus 100 can freely change the order of displaying the icons displayed on the first operation screen B in response to the user's operation, for example.

[3-2] Second Example of Behavior of First Operation Screen B (Rollover Operation)

Figure 6A:
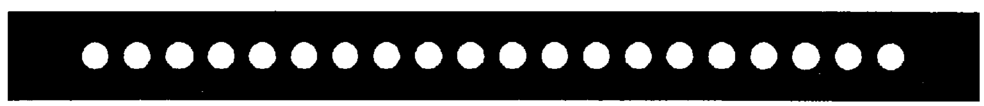
FIG. 6A is a first explanatory diagram showing a second example of a behavior of a first operation screen B to be displayed on the display screen by the information processing apparatus according to the embodiment of the present invention.
Figure 6B:
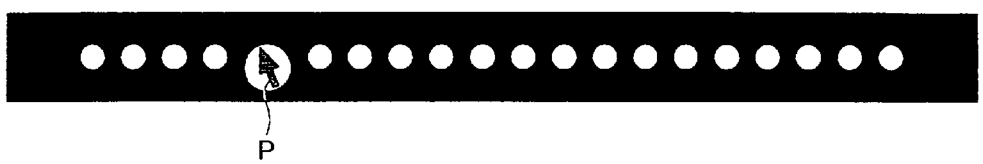
FIG. 6B is a first explanatory diagram showing the second example of a behavior of the first operation screen B to be displayed on the display screen by the information processing apparatus according to the embodiment of the present invention.

FIGS. 6A and 6B are first explanatory diagrams showing the second example of the behavior of the first operation screen B to be displayed on the display screen by the information processing apparatus 100 according to the embodiment of the present invention. FIGS. 6A and 6B show part of the first operation screen B. FIG. 6A shows the first operation screen B before the pointer P overlaps on the icon within the first operation screen B or the surrounding of the icon (which will be referred to as "rollover" below). FIG. 6B shows one example of the first operation screen B subjected to the rollover.

When the user operates the mouse and thus the pointer P rolls over the icon, for example, the information processing apparatus 100 enlarges the display size of the rolled-over icon (FIG. 6B). When the display size of the rolled-over icon is enlarged, the information processing apparatus 100 reduces the display size of other icons, for example, so that the apparatus 100 is not beyond the limitation of the area in which the icon is to be displayed.

The rollover area in which the information processing apparatus 100 makes the icon display size larger depending on the position of the pointer P as described above is set to be larger than the icon display size. For example, the information processing apparatus 100 sets half the interval between the icons (the interval in the horizontal direction) as the rollover area, but is not limited thereto. The information processing apparatus 100 sets the rollover area whose upper end is at the 20th pixels over the icon display size and whose lower end is at the end of the part functioning as the launcher, but is not limited thereto. The information processing apparatus 100 sets the rollover area as described above, for example, so that the display size of the rolled-over icon is 1.3 times as large as the default icon size, for example.

Figure 7A:
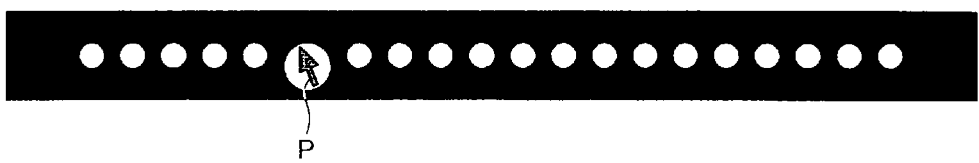
FIG. 7A is a second explanatory diagram showing a second example of a behavior of a first operation screen B to be displayed on the display screen by the information processing apparatus according to the embodiment of the present invention.
Figure 7B:
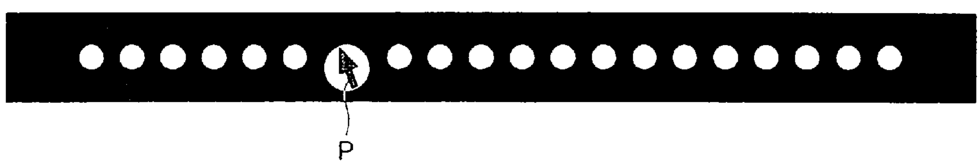
FIG. 7B is a second explanatory diagram showing the second example of a behavior of the first operation screen B to be displayed on the display screen by the information processing apparatus according to the embodiment of the present invention.

FIGS. 7A and 7B are second explanatory diagrams showing the second example of the behavior of the first operation screen B to be displayed on the display screen by the information processing apparatus 100 according to the embodiment of the present invention. FIGS. 7A and 7B show part of the first operation screen B.

As shown in FIGS. 7A and 7B, when the icon to be rolled over changes from one icon to other icon (such as adjacent icon), for example, along with the movement of the pointer P in response to the user's operation, the information processing apparatus 100 changes the display size of a respective icon. More specifically, when the rolled-over icon changes from one icon to other icon, the information processing apparatus 100 returns the display size of the one icon to the original display size. Then, the information processing apparatus 100 makes the icon display size of the other icon larger similar to FIG. 6B.

The information processing apparatus 100 realizes the rollover operation depending on the position of the pointer P as shown in FIGS. 6A to 7B, for example. Of course, the rollover operation in the information processing apparatus 100 according to the embodiment of the present invention is not limited to the above.

[3-3] Third Example of Behavior of First Operation Screen B (Deforming Operation of Launcher Part)

Figure 8A:
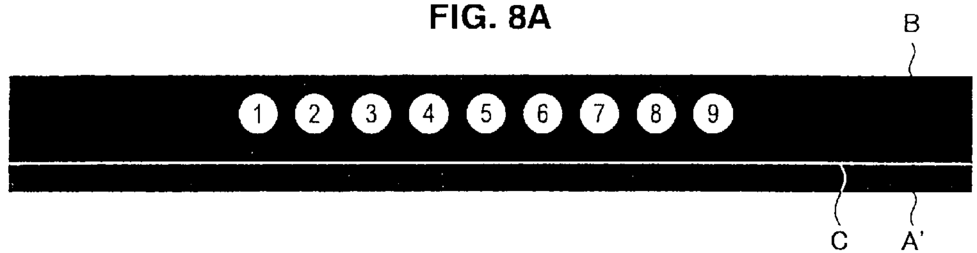
FIG. 8A is a first explanatory diagram showing a third example of a behavior of a first operation screen B to be displayed on the display screen by the information processing apparatus according to the embodiment of the present invention.
Figure 8B:
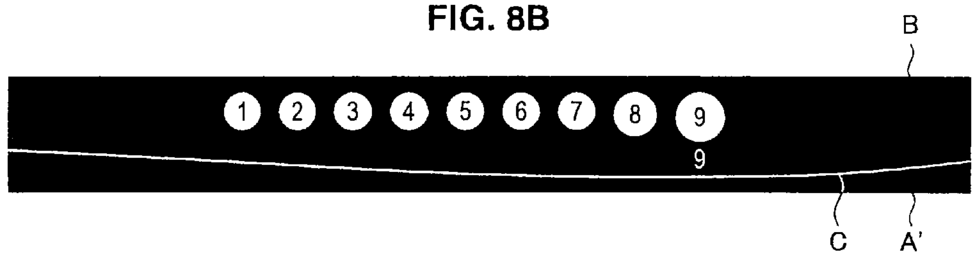
FIG. 8B is a first explanatory diagram showing the third example of a behavior of the first operation screen B to be displayed on the display screen by the information processing apparatus according to the embodiment of the present invention.

FIGS. 8A and 8B are first explanatory diagrams showing the third example of the behavior of the first operation screen B to be displayed on the display screen by the information processing apparatus 100 according to the embodiment of the present invention. FIGS. 8A and 8B show part of the first operation screen B. FIGS. 8A and 8B omit the pointer P.

The fixed spaces, for example, are provided at the right and left sides of the launcher part of the first operation screen and no icon is displayed in the spaces. The setting of the fixed spaces are associated with the setting of the area for defining the launcher's size in the horizontal direction like S2 shown in FIGS. 5B and 5C, for example. The fixed space includes a width of 150 pixels irrespective of the resolution of the display screen, for example.

When the pointer P is positioned within the fixed space, the information processing apparatus 100 does not deform the launcher part (FIG. 8A). This corresponds to the fact that the launcher does not respond to the user's operation.

When the pointer P rolls over the icon, for example, the information processing apparatus 100 changes the shape of the display line C in association with the change in the icon display size (above [3-2]) such that a space is provided under the icon (FIG. 8B). When the shape of the display line C changes, the information processing apparatus 100 can display additional information such as application name, link name and rolled-over icon in the space generated due to the change (FIG. 8B).

More specifically, when the distance between the position of the pointer P (operation position) and the icon is equal to or less than a predetermine distance (when being within the rollover area), the information processing apparatus 100 deforms the part positioned immediately under the icon in the display line C such that the distance relative to the pointer P is larger. The information processing apparatus 100 realizes the deformation of the display line C by changing the control point of the Bezier curve, for example, but is not limited thereto.

When the rolled-over icon changes as shown in FIGS. 7A and 7B, for example, the information processing apparatus 100 restores the shape of the deformed display line C to the original shape. More specifically, when the distance between the position of the pointer P (operation position) and the icon is larger than the predetermined distance (when being outside the rollover area), the information processing apparatus 100 causes the shape of the deformed display line C to bound several times due to inertial, for example, thereby elastically restoring to the shape of the pre-deformed display line C. Then, the information processing apparatus 100 deforms the part of the display line C corresponding to a new rolled-over icon.

The information processing apparatus 100 performs the restoring of the display line C and the new deformation in a synchronized manner (for preventing failed display), for example, but is not limited thereto. For example, the information processing apparatus 100 can omit part of the processing of restoring the display line C and perform the new deforming processing.

The information processing apparatus 100 realizes the deforming operation of the launcher part of the first operation screen B as described above, for example. Of course, the operation of deforming the launcher part of the first operation screen B according to the embodiment of the present invention is not limited to the above.

The information processing apparatus 100 realizes the behaviors in response to the user's operation on the first operation screen B as shown in the above [3-1] to [3-3], for example. Of course, the behavior in response to the user's operation on the first operation screen B according to the embodiment of the present invention is not limited to the operations in the above [3-1] to [3-3].

[4] Transition from Launcher Display Status St2 to Execution Status St4

When the rolled-over icon is selected through the user's selecting operation such as click operation using the mouse or touch operation on the display screen, for example, the information processing apparatus 100 executes the application corresponding to the icon (transition to the execution status St4). At this time, the information processing apparatus 100 can display the first operation screen B on the display screen, for example, but is not limited thereto. For example, the information processing apparatus 100 may display the second operation screen A instead of the first operation screen B on the display screen.

[5] Transition Between Minimized Status St1 and Information Providing Status St3

The information processing apparatus 100 transits the status between the minimized status St1 and the information providing status St3 based on the setting of the operation application, for example. The above setting is performed based on the user's operation, for example, but is not limited thereto.

More specifically, when the operation application is set to display the information to be provided to the user in the display area of the second operation screen B, for example, the information processing apparatus 100 transits the status from the minimized status St1 to the information providing status St3. When the operation application is not set to display the information to be provided to the user in the display area of the second operation screen B, for example, the information processing apparatus 100 does not transit the status from the minimized status St1 to the information providing status St3. Further, when the setting of the operation application is changed not to display the information in the information providing status St3, the information processing apparatus 100 transits the status from the information providing status St3 to the minimized status St1.

The transition between the minimized status St1 and the information providing status St3 in the information processing apparatus 100 according to the embodiment of the present invention is not limited to the above. For example, when an application message is provided to the user, the information processing apparatus 100 automatically transits the status from the minimized status St1 to the information providing status St3, thereby displaying the application message in the display area of the second operation screen. From the above, the information processing apparatus 100 can rapidly notify (provide to) the user of the message indicating an alert such as hardware abnormality, for example.

[6] Information Providing Status St3

Figure 9:
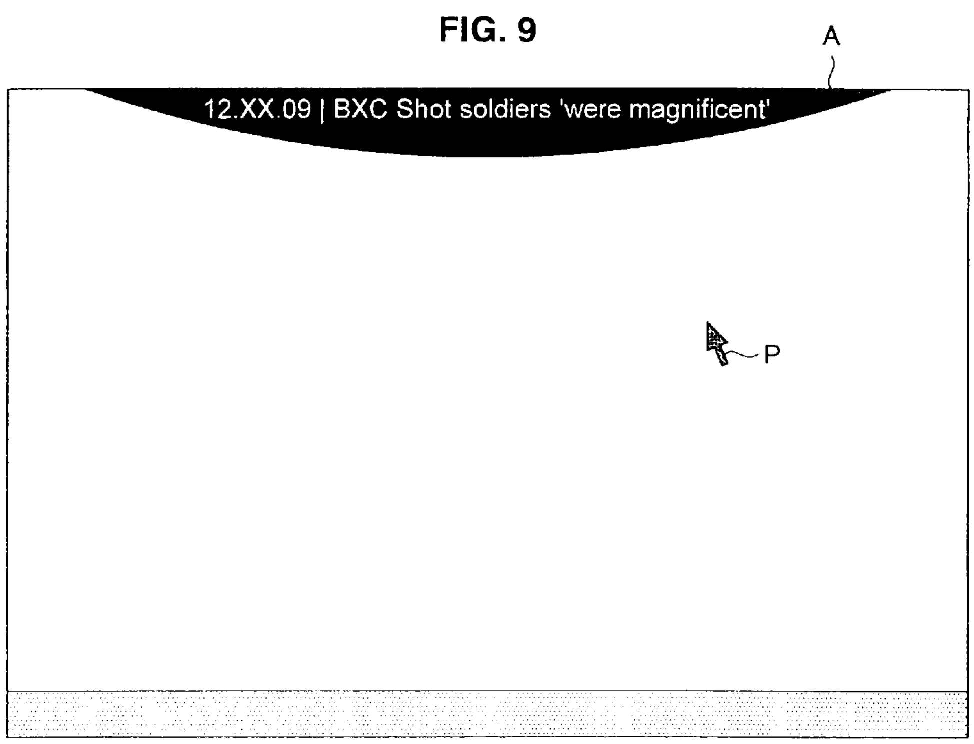
FIG. 9 is an explanatory diagram showing one example of an information providing status of an operation application to be executed by the information processing apparatus according to the embodiment of the present invention.

FIG. 9 is an explanatory diagram showing one example of the information providing status St3 of the operation application to be executed by the information processing apparatus 100 according to the embodiment of the present invention. FIG. 9 shows one example of the second operation screen A similar to FIG. 2.

The information processing apparatus 100 displays the display information in the display area of the second operation screen A as shown in FIG. 9. FIG. 9 shows an example in which unread news in a RSS feed is displayed as the display information on the second operation screen A, but the second operation screen A is not limited thereto. For example, the information processing apparatus 100 can display various items of display information such as advertisement, recommend information and application message on the second operation screen A. The number of sources of the display information to be displayed on the second operation screen A may increase over time, for example. The information processing apparatus 100 displays the display information on the second operation screen A for providing (or notifying) the display information so as not to hinder the user.

The information processing apparatus 100 determines the number of items of the display information to be displayed for one hour (one example of a predetermined time) from the following formula 3, for example.

Number of items of display information to be displayed/hour=3600/(display hours+intervals) (Formula 3)

For example, when it is determined from the formula 3, for example, that 10 items of display information are displayed for one hour, and the display information indicating two advertisements is displayed for one hour, the information processing apparatus 100 uniformly displays the advertisements with "RRRRXRRRRX", but is not limited to the above. In the above case, "R" indicates the RSS feed and X indicates an advertisement message. When a hidden RSS feed is not present in the above scheduling, the information processing apparatus 100 generates the time for which the display information is not displayed between the two advertisements, for example.

Figure 10A:
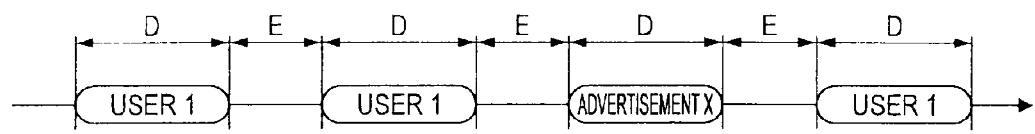
FIG. 10A is an explanatory diagram showing a display example of display information to be displayed on the second operation screen in the information processing apparatus according to the embodiment of the present invention.
Figure 10B:
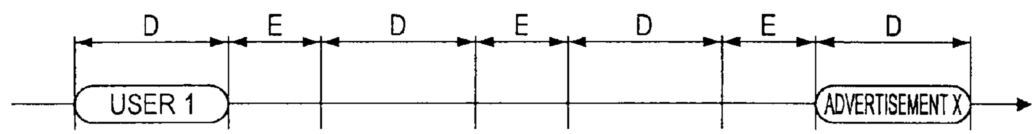
FIG. 10B is an explanatory diagram showing a display example of display information to be displayed on the second operation screen in the information processing apparatus according to the embodiment of the present invention.
Figure 10C:
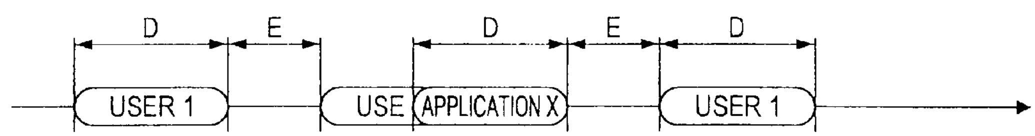
FIG. 10C is an explanatory diagram showing a display example of display information to be displayed on the second operation screen in the information processing apparatus according to the embodiment of the present invention.

FIGS. 10A to 10C are explanatory diagrams showing the display examples of the display information to be displayed on the second operation screen A in the information processing apparatus 100 according to the embodiment of the present invention. The interval D shown in FIGS. 10A to 10C indicates a display time of the display information, and the interval E shown in FIGS. 10A to 10C indicates a nondisplay time of the display information. "User 1" shown in FIGS. 10A to 10C indicates recommend information or RSS feed among the display information, or an application message, and "advertisement X" shown in FIGS. 10A to 10C indicates an advertisement message among the display information. Then, "application 1" shown in FIGS. 10A to 10C indicates an application message among the display information.

The information processing apparatus 100 can display the display information for a set display time as shown in FIG. 10A, for example. When the display information to be displayed for the set display time is not present, the information processing apparatus 100 can hide the display information for the display time D as shown in FIG. 10B, for example. When there is present an application message such as a message indicating an alert such as hardware abnormality, which is desirably notified to the user as quickly as possible, the information processing apparatus 100 can display the application X to be broken in other display information as shown in FIG. 10C. Of course, the display example of the display information to be displayed on the second operation screen A according to the embodiment of the present invention is not limited to FIGS. 10A to 10C.

Figure 11:
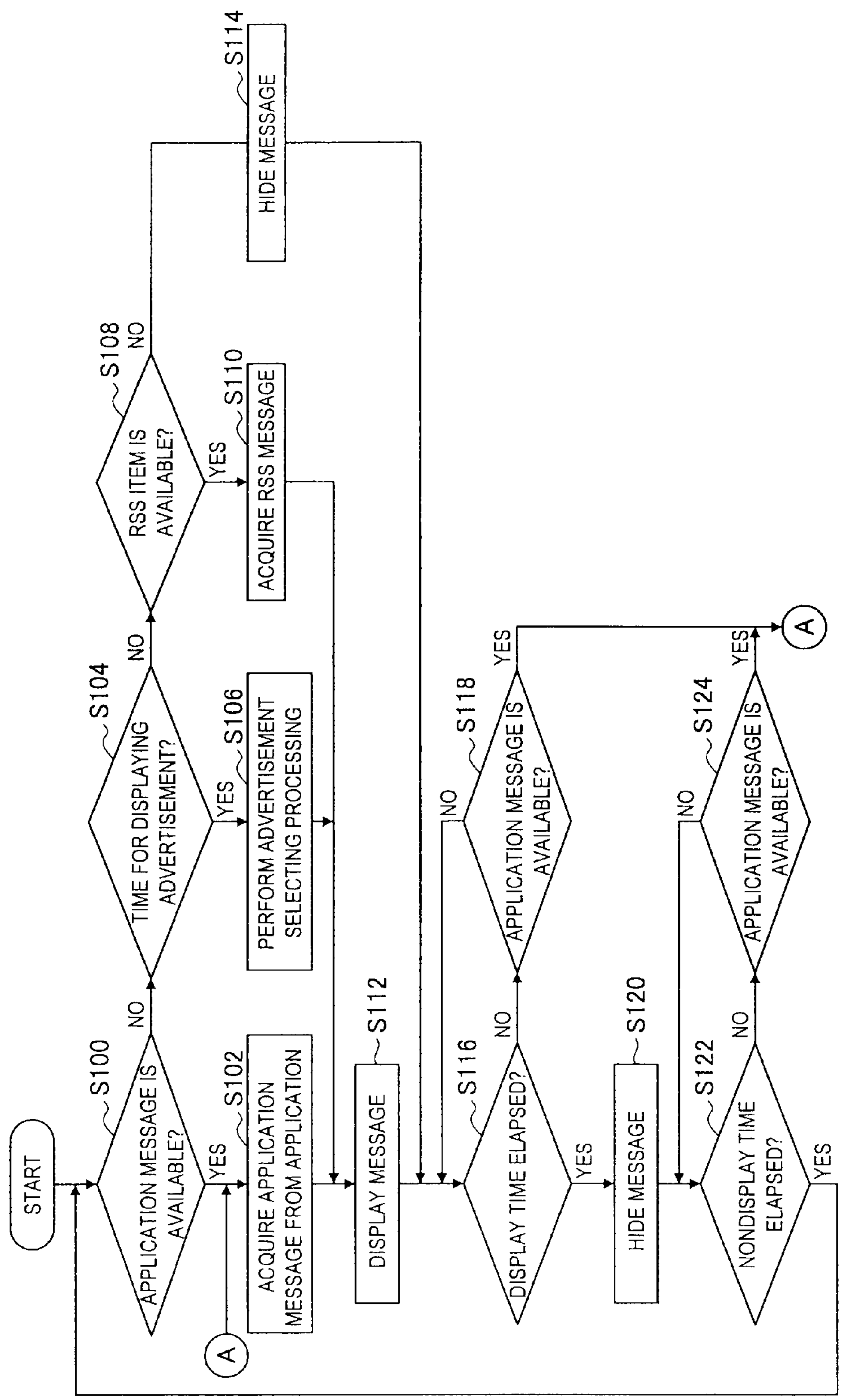
FIG. 11 is a flowchart showing one example of a processing of displaying the display information on the second operation screen in the information processing apparatus according to the embodiment of the present invention.

There will be described more specifically the processing of displaying the display information on the second operation screen A by the information processing apparatus 100. FIG. 11 is a flowchart showing one example of the processing of displaying the display information on the second operation screen A in the information processing apparatus 100 according to the embodiment of the present invention. FIG. 11 shows one example of the processing when a schedule of displaying the display information is determined by the formula 3, for example, and the initial display time for displaying the display information is reached.

An explanation is made in FIG. 11 assuming that the information processing apparatus 100 appropriately sets the display schedule as a different processing from the processing shown in FIG. 11. The information processing apparatus 100 can terminate the processings shown in FIG. 11 depending on the transition to the minimized status St1 described above or the transition to the execution status St4 described later, for example.

The information processing apparatus 100 determines whether the application message is available (S100). When the operation application has received the notification indicating that there is an application message to be transmitted from other application, the information processing apparatus 100 determines that the application message is available, but is not limited to the above.

When the application message is determined to be available in step S100, the information processing apparatus 100 acquires the application message from the application (S102). Then, the information processing apparatus 100 displays the application message (display information) acquired in step S102 in the display area of the second operation screen A (S112).

When the application message is determined not to be available in step S100, the information processing apparatus 100 determines whether the time for displaying the advertisement is reached based on the set schedule (for example, FIGS. 10A to 10C) (S104).

When it is determined in step S104 that the time for displaying the advertisement is reached, the information processing apparatus 100 performs an advertisement selecting processing based on the preference information (S106).

The information processing apparatus 100 performs the advertisement selecting processing based on the preference information and the advertisement information stored in a storage unit (described later). More specifically, the information processing apparatus 100 selects an advertisement message which is hidden and has a high priority among the advertisement messages extracted from the storage unit (described later) based on the preference information, thereby realizing the advertisement selecting processing.

More specifically, when it is determined in step S104 that the time for displaying the advertisement is reached, the information processing apparatus 100 performs the following advertisement message extracting processing and then performs the advertisement selecting processing based on the extracted information, for example.

The processing of extracting an advertisement message based on the preference information according to the embodiment of the present invention will be described. The information processing apparatus 100 according to the embodiment of the present invention uses a policy file and an advertisement file for each advertiser which provides the advertisement to be displayed, which are stored in the storage unit (described later), to perform the extracting processing. The policy file according to the embodiment of the present invention records therein the number of advertisement messages to be displayed for each hour, the priority order of the advertisement (order of advertiser which provides the advertisement to be displayed, for example), and other detailed information (such as file path to each advertisement file), but is not limited thereto.

The policy file according to the embodiment of the present invention and the advertisement file can be recognized as the advertisement information according to the embodiment of the present invention. The information processing apparatus 100 receives the advertisement file and policy file transmitted from an external device and stores the same in the storage unit (described later), and appropriately updates the policy file (for example, file path to each advertisement file), but is not limited thereto.

[One Example of Advertisement Message Extracting Processing]

1. The information processing apparatus 100 extracts a schedule sequence from the policy file and then extracts a corresponding file path of each advertiser (which may be referred to as "partner" below).

The advertisement priority order is partner 1, partner 2, partner 3, and partner 4, and the corresponding advertisement files are advertisement file 1, advertisement file 2, advertising 3, and the advertisement file 4, respectively. The advertisement file includes advertisement message, image path and link information.

2. The information processing apparatus 100 extracts an advertisement message matching with the preference information from the advertisement file 1, and retrieves and marks a display position of the next advertisement message.

The matching with the preference information may meet all the conditions or may meet certain conditions (which is similarly applicable below). There has been described above the example where the information processing apparatus 100 extracts the advertisement message matching with the preference information, but the information processing apparatus 100 is not limited thereto. For example, the information processing apparatus 100 may extract an advertisement message matching with the preference information, identification information and/or area information, for example.

3. The information processing apparatus 100 extracts an advertisement message matching with the preference information from the advertisement file 2, and retrieves and marks a display position of the next advertisement message.

4. The information processing apparatus 100 repeats the processing similar to the above "2" until the advertisement file 4. When the processing is completed until the advertisement file 4, the information processing apparatus 100 repeats the processing from the advertisement file 1. When there is not an advertisement message matching with the preference information in the advertisement file to be processed, for example, the information processing apparatus 100 repeats the processing for the next advertisement file. The information processing apparatus 100 repeats the processing until the advertisement files to be processed is absent.

5. When the advertisement file to be processed is absent through the above processings 1 to 4, the information processing apparatus 100 terminates the advertisement message extracting processing.

The information processing apparatus 100 performs the advertisement message extracting processing as described above, for example. Of course, the advertisement message extracting processing in the information processing apparatus 100 according to the embodiment of the present invention is not limited to the above. When a hidden advertisement message is not present, for example, the information processing apparatus 100 can selectively perform the advertisement message extracting processing, but is not limited thereto.

The information processing apparatus 100 selects an advertisement message which is hidden and has a high priority order from among the advertisement messages extracted as described above, for example, thereby performing the advertisement selecting processing based on the preference information and the advertisement information stored in the storage unit (described later).

The advertisement selecting processing in the information processing apparatus 100 according to the embodiment of the present invention is not limited to the above. For example, the information processing apparatus 100 transmits the preference information to the information providing server 200, and receives the advertisement information (one example of the display information) generated by the information providing server 200 based on the preference information, thereby realizing the advertisement selecting processing.

The information providing server 200 generates the advertisement information matching with the preference indicated by the preference information based on an advertisement database (which may be referred to as "advertisement DB" below) which stores the advertisement information in the storage unit (described later), and the received preference information, but is not limited thereto. Then, the information providing server 200 transmits the generated advertisement information to the information processing apparatus 100 which has transmitted the preference information.

Thus, the information processing apparatus 100 can receive the advertisement information which is generated by the information providing server 200 based on the preference information transmitted by the information processing apparatus 100. The information to be transmitted by the information processing apparatus 100 to the information providing server 200 is not limited to the preference information. For example, when the information processing apparatus 100 transmits the preference information, the identification information and/or the area information, the information providing server 200 can generate the advertisement information matching with the additionally-received identification information and/or area information as well as the preference information. In the above case, the information processing apparatus 100 can acquire the advertisement information having a high possibility of attracting the user from the information providing server 200.

When the advertisement selecting processing is performed in step S106, the information processing apparatus 100 displays the selected advertisement message (display information) in the display area of the second operation screen A (S112).

When it is not determined in step S104 that the time for displaying the advertisement has not been reached, the information processing apparatus 100 determines whether the RSS item is available (S108).

When the RSS item is determined to be available in step S108, the information processing apparatus 100 acquires the RSS message from the RSS manager (one example of other application), for example (S110).

The information processing apparatus 100 acquires one RSS message among the RSS messages extracted by the following RSS message extracting processing from the RSS manager, for example, thereby performing the processing in step S110.

One example of the RSS message extracting processing in the information processing apparatus 100 according to the embodiment of the present invention will be described by way of example of the case where the RSS messages R1 to R10 are registered in the RSS feed list. Of course, the RSS message extracting processing in the information processing apparatus 100 according to the embodiment of the present invention is not limited to the following processings.

[One Example of RSS Message Extracting Processing]

1. The information processing apparatus 100 extracts one RSS message from among R1 to R5 registered in the feed list.

The RSS message extracted by the information processing apparatus 100 needs to meet certain conditions. The conditions include that the browser has not been activated, that the RSS message has not been read, that the local ID is maximum, and the like, but are not limited thereto.

2. The information processing apparatus 100 extracts one RSS message which meets the above conditions from among R6 to R10 registered in the feed list.

3. When all the RSS messages are completed to display and the processing is restarted from the beginning, the information processing apparatus 100 extracts one RSS message from R1 to R5. The information processing apparatus 100 reads out the RSS feed list (common feed list) once and acquires five RSS messages. For example, the information processing apparatus 100 acquires four RSS messages from R1 to R5 and acquires one RSS message which meets the conditions from R6 to R10.

The information processing apparatus 100 acquires the RSS messages extracted by the above RSS message extracting processing, for example, in step S110. Then, the information processing apparatus 100 displays one RSS message (display information) among the acquired RSS messages in the display area of the second operation screen A (S112).

When the RSS item is not determined to be available in step S108, the information processing apparatus 100 does not display the message in the display area of the second operation screen A (S114). It is realized that the display information is not displayed although the display time is reached as shown in FIG. 10B, for example, in the above step S114.

When the message (display information) is displayed in step S112 or the message is not displayed in step S114, the information processing apparatus 100 determines whether the display time of the display information has elapsed (S116).

The information processing apparatus 100 starts counting by a timer from when the processing in step S112 or S114 has started, and detects a predetermined elapsed time based on the counting to make a determination in step S116, but is not limited thereto.

When it is not determined in step S116 that the display time of the display information has elapsed, the information processing apparatus 100 determines whether the application message is available similar to step S100 (S118).

When it is not determined in step S118 that the application message is available, the information processing apparatus 100 performs the processing in step S102. It is realized that the application message is displayed to be broken in other display information as shown in FIG. 10C, for example, through the above processing.

When it is not determined in step S118 that the application message is available, the information processing apparatus 100 repeats the processings in step S116 and its subsequent steps.

When it is determined in step S116 that the display time of the display information has elapsed, the information processing apparatus 100 hides the message (display information) displayed in the display area of the second operation screen A (S120).

When the message (display information) is hidden in step S120, the information processing apparatus 100 determines whether the nondisplay time of the display information has elapsed (S122).

The information processing apparatus 100 starts counting by a timer from when the processing in step S120 has been started, and detects a predetermined elapsed time based on the counting to make a determination in step S122, but is not limited thereto.

When it is not determined in step S122 that the display time of the display information has elapsed, the information processing apparatus 100 determines whether the application message is available similar to step S100 (S124).

When it is not determined in step S124 that the application message is available, the information processing apparatus 100 performs the processing in step S102 like when it is not determined in step S118 that the application message is available.

When it is not determined in step S124 that the application message is available, the information processing apparatus 100 repeats the processings in step S122 and its subsequent steps.

When it is determined in step S122 that the display time of the display information has elapsed, the information processing apparatus 100 repeats the processings in step S100 and its subsequent steps.

The information processing apparatus 100 performs the processing of displaying the display information on the second operation screen A through the processings shown in FIG. 11, for example.

The processing of displaying the display information on the second operation screen A in the information processing apparatus 100 according to the embodiment of the present invention is not limited to the processings shown in FIG. 11. For example, the information processing apparatus 100 is not limited to the displaying of the application message, the advertisement message and the RSS message in steps S100 to S110 as display information on the second operation screen A, and may further acquire and display the recommend information.

The information processing apparatus 100 generates the recommend information based on, for example, the preference information and various items of data such as content data stored in the storage unit (described later) or data acquired from an external device (retrieved and acquired data), but is not limited thereto.

For example, the information processing apparatus 100 transmits the preference information to the information providing server 200 and receives the recommend information (one example of the display information) generated by the information providing server 200 based on the preference information, thereby acquiring the recommend information.

The information providing server 200 generates the recommend information based on, for example, various items of data such as data (retrieved and acquired data) which is acquired from an external device by using a search word based on the received preference information to retrieve the network, but is not limited thereto. Then, the information providing server 200 transmits the generated recommend information to the information processing apparatus 100 which has transmitted the preference information. Thus, the information processing apparatus 100 can receive the recommend information generated by the information providing server 200 based on the preference information transmitted by the information processing apparatus 100.

The information processing apparatus 100 provides (notifies) the information to the user by displaying the display information in the display area of the second operation screen A as described above, for example. Of course, the method for providing (the method for notifying) the display information in the information processing apparatus 100 according to the embodiment of the present invention is not limited to the above.

[7] Transition from Information Providing Status St3 to Launcher Display Status St2

When it is detected that the pointer P is positioned within the second operation screen A (within the lip shape) through the user's operation, the information processing apparatus 100 transits the status from the information providing status St3 to the launcher display status St2. Of course, the transition from the information providing status St3 to the launcher display status St2 in the information processing apparatus 100 according to the embodiment of the present invention is not limited to the above.

[8] Transition from Information Providing Status St3 to Execution Status St4

When the display information displayed in the display area of the second operation screen A is selected through the user's selecting operation such as click operation using the mouse or touch operation on the display screen, for example, the information processing apparatus 100 performs the processing corresponding to the display information (transition to the execution status St4). As described above, the display information according to the embodiment of the present invention has the parameters indicating the processing contents to be executed, for example. Thus, the information processing apparatus 100 can perform the processings depending on the parameters indicating the processing contents to be executed, which correspond to the selected display information.

The information processing apparatus 100 can leave the second operation screen A according to the embodiment of the present invention displayed on the display screen while the status is transited to the execution status St4 and the processing is being executed. In other words, the transition from the information providing status St3 to the execution status St4 according to the embodiment of the present invention is not the transition of the status of the operation application according to the embodiment of the present invention but other processing independent from the operation application to be performed by the information processing apparatus 100. Thus, even when the status is transited to the execution status St4, the information processing apparatus 100 can transit the status to the minimized status St1 or launcher display status St2 based on the user's operation.

The information processing apparatus 100 provides the display information to the user via the operation application for displaying the first operation screen B and the second operation screen A on the display screen through the above [1] to [8], for example. Since the operation application according to the embodiment of the present invention has the application launcher function and the information notification function, the provision of the display information based on the user's preference and the execution of the processing in response to the user's operation can be realized. Thus, the information processing apparatus 100 can provide the information capable of attracting the user, which matches with the user's preference, to the user and improve the user's convenience when the user is attracted by the provided information.

The information processing apparatus 100 can notify the user of the display information (information important for the user) such as a message (one example of the application message) indicating an alert, which is desirably notified to the user even if it is not necessarily based on the user's preference. The above display information can attract the user with high possibility even if it is not necessarily based on the user's preference. Then, also in the above case, when the display information is selected through the user's selecting operation, for example, the information processing apparatus 100 performs the processing in response to the user's operation. Thus, the information processing apparatus 100 can provide the information capable of highly attracting the user, which is not necessarily based on the user's preference, and improve the user's convenience when the user is attracted by the provided information.

Further, the information processing apparatus 100 can use the history of the user's selecting operation on the first operation screen B or the user's operation such as display information selecting operation on the second operation screen A, for example, for analyzing the user's preference. Thus, the information processing apparatus 100 can provide the display information with higher accuracy, which matches with the user's preference, to the user over time, and thus can provide the display information capable of attracting the user to the user.

Therefore, the information processing apparatus 100 can use the convenience improving approach according to the embodiment of the present invention to provide the information capable of attracting the user to the user, and can improve the user's convenience when the user is attracted by the provided information.

(Information Processing System According to the Embodiment of the Present Invention)

Figure 12:
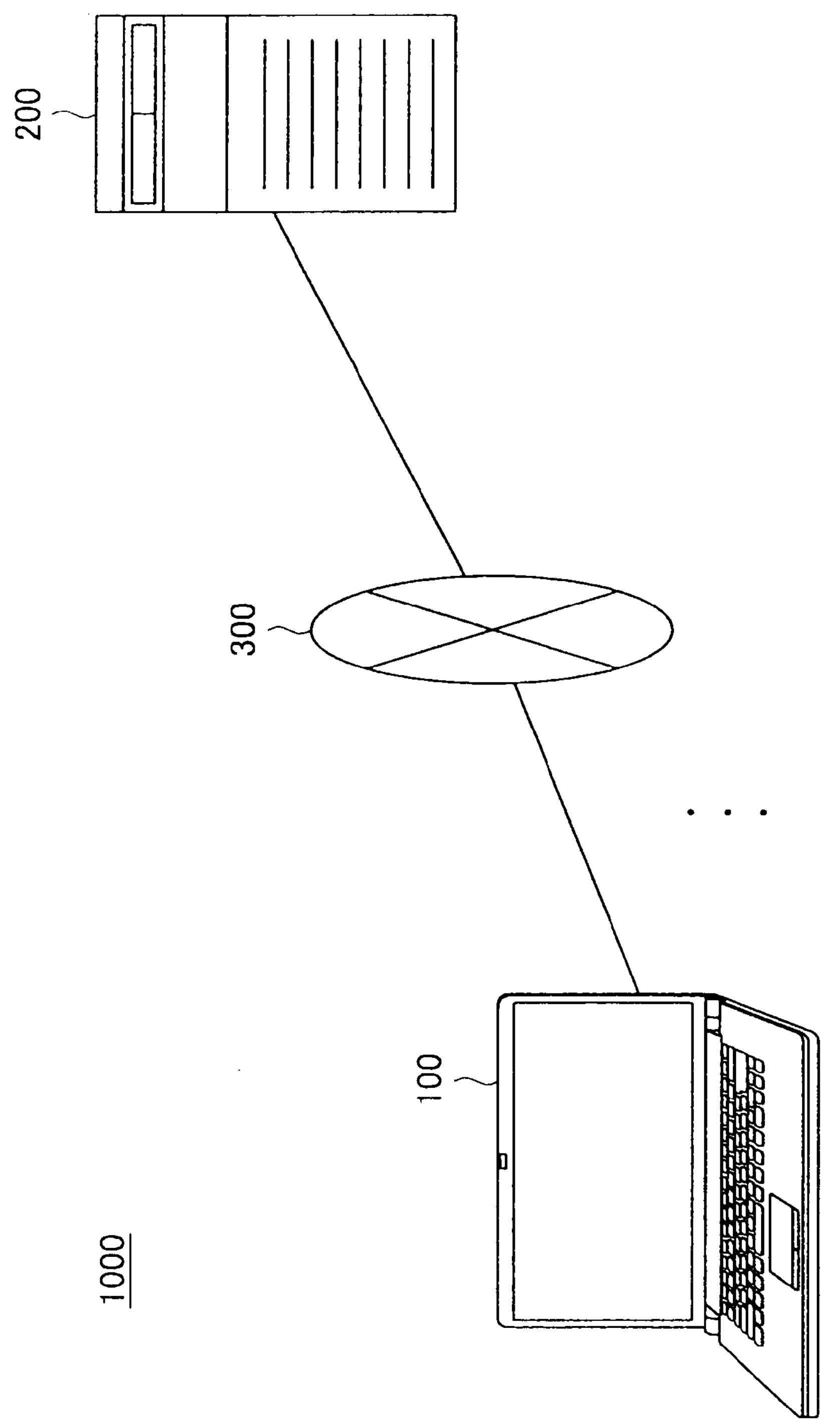
FIG. 12 is an explanatory diagram for explaining the outline of an information processing system according to the embodiment of the present invention.

Next, there will be described a configuration example of the information processing system 1000 capable of realizing the convenience improving approach according to the embodiment of the present invention described above. FIG. 12 is an explanatory diagram for explaining the outline of the information processing system 1000 according to the embodiment of the present invention.

With reference to FIG. 12, the information processing system 1000 has the information processing apparatus 100 and the information providing server 200. FIG. 12 shows only one information processing apparatus 100, but the information processing system 1000 according to the embodiment of the present invention may have a plurality of information processing apparatuses having the similar function and configuration to the information processing apparatus 100. The information processing system 1000 can have various servers such as a server for providing a cloud service and a server for storing therein content data.

In FIG. 12, a notebook-type PC (Personal Computer) is illustrated as the information processing apparatus 100, but the information processing apparatus 100 according to the embodiment of the present invention is not limited to the above. FIG. 12 shows a server as the information providing server 200 but the information providing server 200 according to the embodiment of the present invention is not limited to the above.

The information processing apparatus 100 and the information providing server 200 are connected to each other via a network 300. The connection according to the embodiment of the present invention means being in a communicable status (or entering a communicable status).

The network 300 includes but is not limited to a wired network such as LAN (Local Area Network) or WAN (Wide Area Network), a wireless network such as wireless WAN (WWAN; Wireless Wide Area Network) or wireless MAN (WMAN; Wireless Metropolitan Area Network) via base stations, or Internet using a communication protocol such as TCP/IP (Transmission Control Protocol/Internet Protocol).

The configuration examples of the information processing apparatus 100 and the information providing server 200 constituting the information processing system 1000 will be described below.

[Information Processing Apparatus 100]

Figure 13:
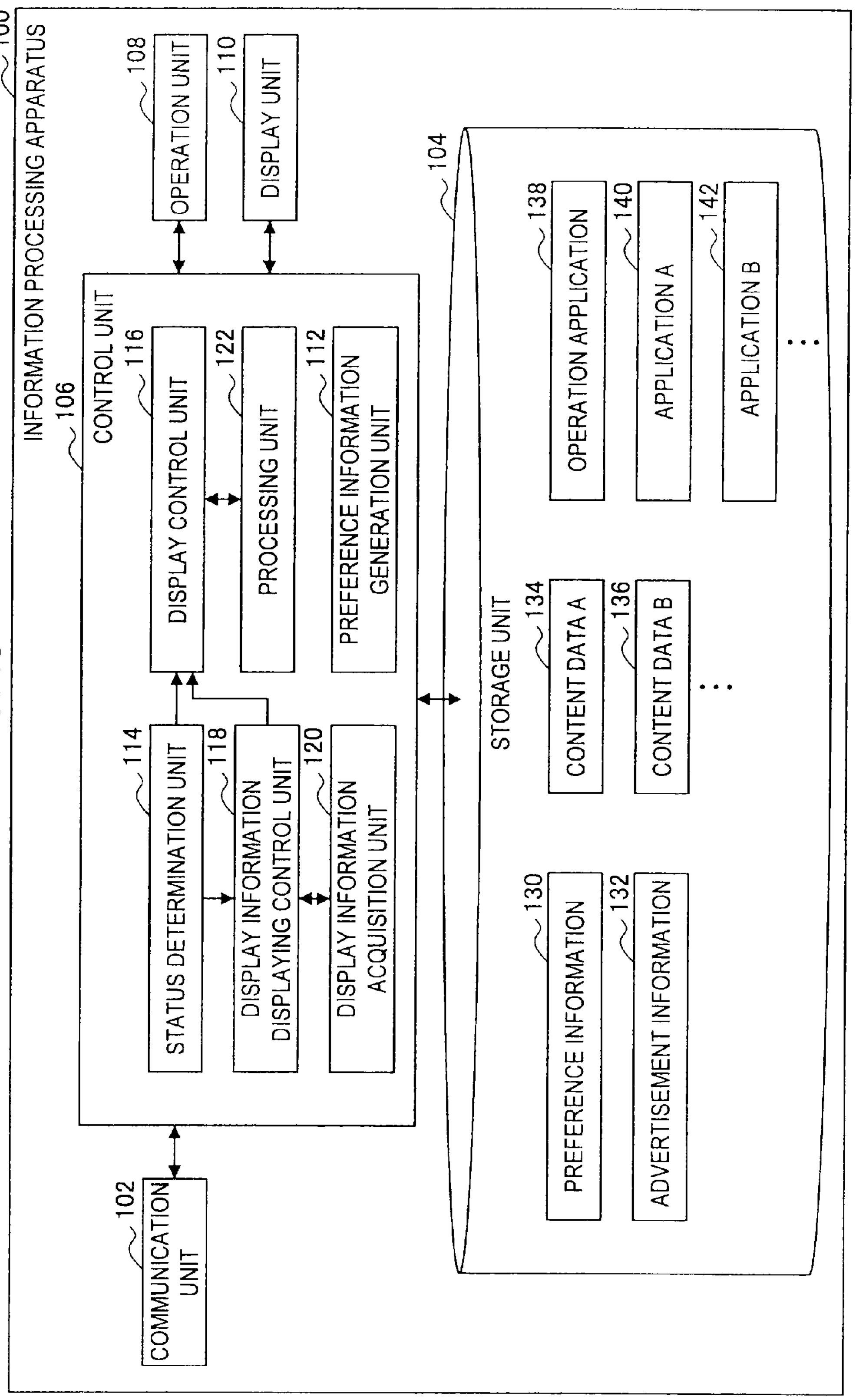
FIG. 13 is an explanatory diagram showing one example of a configuration of the information processing apparatus according to the embodiment of the present invention.

FIG. 13 is an explanatory diagram showing one example of the configuration of the information processing apparatus 100 according to the embodiment of the present invention. The information processing apparatus 100 includes a communication unit 102 (apparatus side communication unit), a storage unit 104, a control unit 106, an operation unit 108 and a display unit 110.

Further, the information processing apparatus 100 may include a ROM (Read Only Memory; not shown) or RAM (Random Access Memory; not shown), for example. The information processing apparatus 100 connects the respective components via a bus as a data transmission path.

The ROM (not shown) stores therein programs to be used by the control unit 106 or control data such as operation parameters. The RAM (not shown) temporarily stores therein programs to be executed by the control unit 106.

[Hardware Configuration Example of Information Processing Apparatus 100]

Figure 14:
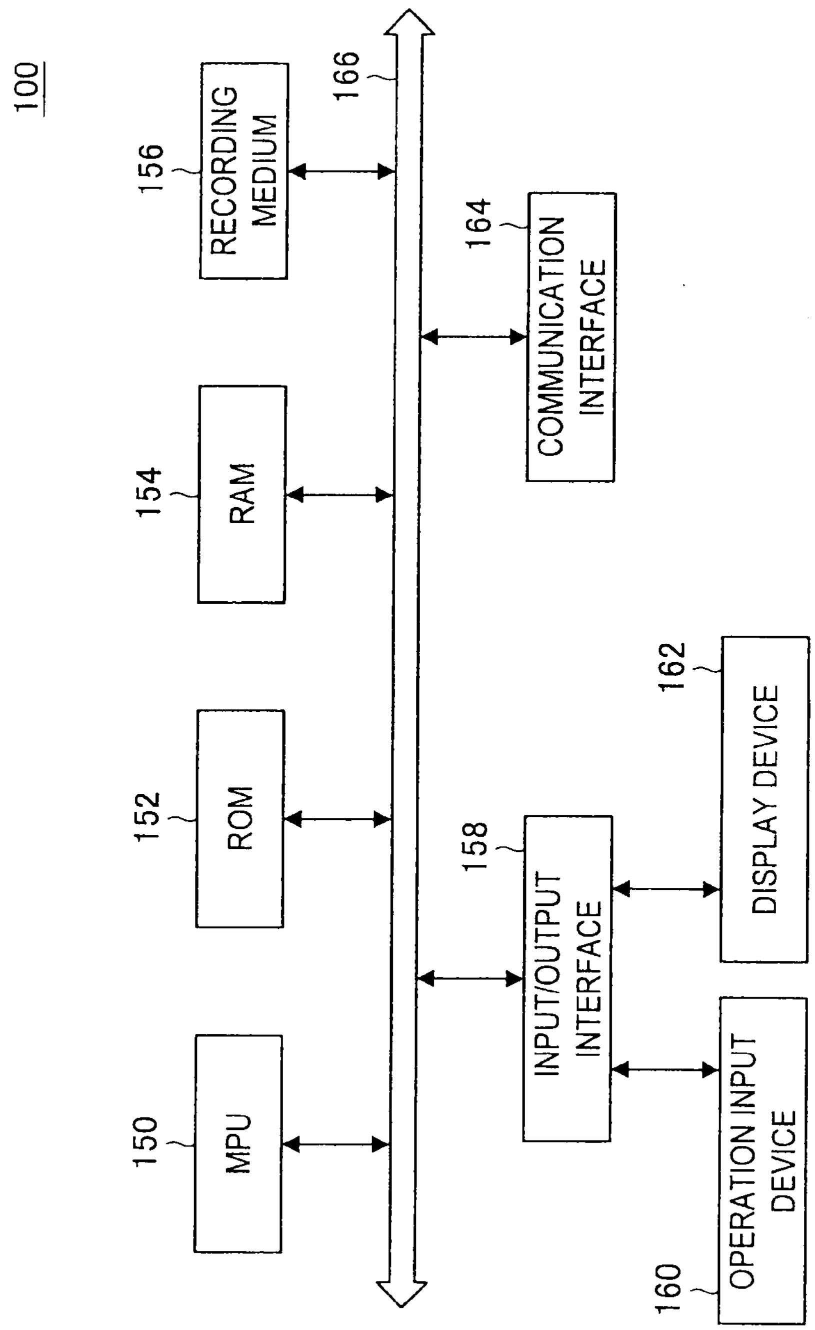
FIG. 14 is an explanatory diagram showing one example of a hardware configuration of the information processing apparatus according to the embodiment of the present invention.

FIG. 14 is an explanatory diagram showing one example of the hardware configuration of the information processing apparatus 100 according to the embodiment of the present invention. With reference to FIG. 14, the information processing apparatus 100 includes a MPU 150, a ROM 152, a RAM 154, a recording medium 156, an input/output interface 158, an operation input device 160, a display device 162, and a communication interface 164, for example. Further, the information processing apparatus 100 connects the respective components via a bus 166 as a data transmission path, for example.

The MPU 150 is configured with a MPU (Micro Processing Unit) or an integrated circuit in which a plurality of circuits for realizing a control function are integrated, and functions as the control unit 106 for entirely controlling the information processing apparatus 100. The MPU 150 can serve as a preference information generation unit 112, a status determination unit 114, a display control unit 116, a display information displaying control unit 118, a display information acquisition unit 120 and a processing unit 122 described later in the information processing apparatus 100.

The ROM 152 stores therein programs to be used by the MPU 150 or control data such as operation parameters, and the RAM 154 temporarily stores therein programs to be executed by the MPU 150, for example.

The recording medium 156 functions as the storage unit 104, and records therein various items of data such as preference information, advertisement information, display information, content data, operation applications, or applications registered in the operation applications. The recording medium 156 includes but is not limited to a magnetic recording medium such as hard disk, or a nonvolatile memory such as EEPROM (Electrically Erasable and Programmable Read Only Memory), flash memory, MRAM (Magnetoresistive Random Access Memory), FeRAM (Ferroelectric Random Access Memory) or PRAM (Phase change Random Access Memory). Further, the information processing apparatus 100 can include the recording medium 156 attachable/detachable to/from the information processing apparatus 100.

The input/output interface 158 connects with the operation input device 160 and the display device 162, for example. The operation input device 160 functions as the operation unit 108, and the display device 162 functions as the display unit 110. The input/output interface 158 includes but is not limited to a USB (Universal Serial Bus) terminal, a DVI (Digital Visual Interface) terminal, a HDMI (High-Definition Multimedia Interface) terminal and various processing circuits, for example. The operation input device 160 is provided in the information processing apparatus 100, for example, and is connected to the input/output interface 158 inside the information processing apparatus 100. The operation input device 160 includes but is not limited to a rotary selector such as button, directional key or jog dial, or a combination thereof. The display device 162 is provided in the information processing apparatus 100, for example, and is connected to the input/output interface 158 inside the information processing apparatus 100. The display device 162 includes but is not limited to a liquid crystal display (LCD) or organic electroluminescence display (or referred to as OLED display (Organic Light Emitting Diode display)). Of course, the input/output interface 158 can connect with an operation input device (such as keyboard or mouse) or display device (such as external display) as an external device of the information processing apparatus 100.

The communication interface 164 is a communication means provided in the information processing apparatus 100, and functions as the communication unit 102 for making a wired/wireless communication with an external device such as the information providing server 200 via the network 300 (or directly). The communication interface 164 includes but is not limited to communication antenna and RF circuit (wireless communication), IEEE802.15.1 port and exchange circuit (wireless communication), IEEE802.11b port and exchange circuit (wireless communication), or LAN terminal and exchange circuit (wired communication).

The information processing apparatus 100 can perform the processing for the convenience improving approach with the configuration shown in FIG. 14, for example. The hardware configuration of the information processing apparatus 100 according to the embodiment of the present invention is not limited to the configuration shown in FIG. 14. For example, when the information processing apparatus 100 has a GPS function, the information processing apparatus 100 includes an antenna (which may be shared with the communication interface 164) for receiving a GPS signal, for example, or a reception circuit.

With reference to FIG. 13 again, the components of the information processing apparatus 100 will be described. The communication unit 102 is a communication means provided in the information processing apparatus 100 and makes a wired/wireless communication with an external device such as the information providing server 200 via the network 300 (or directly). The communication unit 102 is controlled in its communication by the control unit 106, for example.

The communication unit 102 includes but is not limited to communication antenna and RF circuit, or LAN terminal and exchange circuit, for example. For example, the communication unit 102 can have an arbitrary configuration capable of communicating with an external device via the network 300.

The storage unit 104 is a storage means provided in the information processing apparatus 100. The storage unit 104 includes but is not limited to a magnetic recording medium such as hard disk or a nonvolatile memory such as flash memory.

The storage unit 104 stores therein various items of data such as preference information, advertisement information, display information, content data, operation applications or applications registered in the operation applications. FIG. 13 shows an example where the storage unit 104 stores therein one item of preference information 130, one item of advertisement information 132, content data A 134, content data B 136, . . . , an operation application 138, an application A 140, and an application B 142, . . . , but the storage unit 104 is not limited thereto.

The control unit 106 is configured with a MPU or an integrated circuit in which various processing circuits are integrated, for example, and serves to entirely control the information processing apparatus 100. The control unit 106 includes the preference information generation unit 112, the status determination unit 114, the display control unit 116, the display information displaying control unit 118, the display information acquisition unit 120 and the processing unit 122, and serves to mainly perform the processing for the aforementioned convenience improving approach.

The preference information generation unit 112 analyzes a user's preference based on the user's operation and generates the preference information. Then, the preference information generation unit 112 records the generated preference information in the storage unit 104, for example. The preference information generation unit 112 can analyze a user's preference each time a user's operation is performed, but is not limited thereto. For example, the preference information generation unit 112 can record the history for each user's operation and can periodically/non-periodically analyze the user's preference.

The status determination unit 114 detects a change in the status of the operation application (first status/second status) based on the user's operation and determines the status of the operation application. Then, the status determination unit 114 transmits a determination result to the display control unit 116 and the display information displaying control unit 118. More specifically, the status determination unit 114 detects a transition between the statuses St1 to St4 shown in FIG. 1, for example, and transmits a current status as the determination result to the display control unit 116 and the display information displaying control unit 118.

The display control unit 116 serves to control various displays on the display screen. More specifically, the display control unit 116 selectively displays the first operation screen B and the second operation screen A on the display screen based on the determination result transmitted from the status determination unit 114. In other words, the status determination unit 114 and the display control unit 116 can serve as the operation application status control unit for controlling the status of the operation application according to the embodiment of the present invention based on the user's operation in the information processing apparatus 100. The control unit 106 according to the embodiment of the present invention can further include the operation application status control unit (not shown).

The display control unit 116 displays a pointer (such as the pointer P shown in FIG. 2 and the like) which moves along with the user's operation using the operation unit 108 or an external operation device, for example. In other words, the display control unit 116 can serve as the pointer display control unit for displaying a pointer (such as the pointer P shown in FIG. 2 and the like) which moves in response to the user's operation. The control unit 106 according to the embodiment of the present invention can further include the pointer display control unit (not shown).

The display control unit 116 controls the displaying such that the screens shown in FIGS. 2 to 9, for example, are displayed on the display screen, but the screens to be displayed on the display screen by the display control unit 116 are not limited to the above. For example, when the determination result indicating the execution status St4 is transmitted, the display control unit 116 displays the screen (such as the browser screen or other application's execution screen) for the processing corresponding to the execution status St4 in association with the processing unit 122.

The display information displaying control unit 118 selectively performs the processing of displaying the display information in the display area of the second operation screen A based on the determination result transmitted from the status determination unit 114 and thus displays the display information on the second operation screen A. More specifically, the display information displaying control unit 118 performs the processing when the determination result indicating the information providing status St3 is transmitted from the status determination unit 114. Further, when the determination result indicating the minimized status St1 or the launcher display status St2 is transmitted from the status determination unit 114, the display information displaying control unit 118 does not perform a processing.

The display information displaying control unit 118 performs the processings shown in FIG. 11, for example, in association with the display information acquisition unit 120 to display the display information acquired by the display information acquisition unit 120 in the display area of the second operation screen A. The recommend information as the information to be recommended to the user is included in the display information to be displayed in the display area of the second operation screen A by the display information acquisition unit 120. In other words, when the recommend information is displayed on the second operations screen A, the display information displaying control unit 118 can be recognized as serving as a recommend information displaying control unit. Of course, the processing performed by the display information displaying control unit 118 and the display information acquisition unit 120 in an associated manner is not limited to the processings shown in FIG. 11. The control unit 106 according to the embodiment of the present invention can further include the recommend information displaying control unit (not shown).

The display information acquisition unit 120 performs the processing of acquiring the display information to acquire the display information. More specifically, the display information acquisition unit 120 performs the processing of generating the display information and/or performs the processing of acquiring the display information generated in an external device such as the information providing server 200, thereby acquiring the display information.

When performing the processing of generating the display information, the display information acquisition unit 120 generates the display information based on the preference information generated in the preference information generation unit 112 and various items of data such as the advertisement information 132 or each content data stored in the storage unit 104, for example.

The processing by the display information acquisition unit 120 in generating the display information is not limited to the above. For example, the display information acquisition unit 120 can acquire the information (such as meta information corresponding to the information extracted from the user's audio file reproducing history) from an external device communicable via the network 300 and generate the preference information based on the acquired information.

When performing the processing of acquiring the display information from an external device, the display information acquisition unit 120 transmits, for example, the preference information generated in the preference information generation unit 112 and a request of generating the display information to the information providing server 200 (the communication unit 102 transmits the same). Then, the display information acquisition unit 120 receives the display information transmitted from the information providing server 200, which has been received by the communication unit 102, from the communication unit 102, thereby acquiring the display information.

The information to be transmitted to the information providing server 200 by the display information acquisition unit 120 is not limited to the preference information and the request of generating the display information. For example, the display information acquisition unit 120 can transmit the identification information and/or the area information in addition to the preference information and the request of generating the display information to the information providing server 200. In the above case, the display information acquisition unit 120 can acquire the display information having a higher possibility of attracting the user from the information providing server 200. Further, the display information acquisition unit 120 can transmit the request of generating the display information, the identification information and/or the area information to the information providing server 200 without transmitting the preference information, for example.

It is previously defined whether the display information acquisition unit 120 performs the processing of generating the display information or the processing of acquiring the display information from an external device, or both of them as the processing of acquiring the display information, but the display information acquisition unit 120 is not limited thereto. For example, the display information acquisition unit 120 can switch the processing method for acquiring the display information based on the user's operation. When performing both of the processings, the display information acquisition unit 120 can perform the processing of acquiring the display information from an external device based on a predetermined rule if the display information may not be generated by the processing of generating the display information, for example.

The processing unit 122 performs the processing for the execution status St4 in association with the display control unit 116. More specifically, when the application is selected on the first operation screen B or when the display information is selected on the second operation screen A, the processing unit 122 performs the processing corresponding to the selected application or the selected display information.

The processing unit 122 serves to perform various processings in the control unit 106 such as the processing of controlling the information processing apparatus 100 or the processing for other applications independent from the operation application.

The control unit 106 includes the preference information generation unit 112, the status determination unit 114, the display control unit 116, the display information displaying control unit 118, the display information acquisition unit 120 and the processing unit 122 and thus can serve to mainly perform the processings for the aforementioned convenience improving approach. Of course, the configuration of the control unit provided in the information processing apparatus 100 according to the embodiment of the present invention is not limited to the above.

The operation unit 108 is an operation means provided in the information processing apparatus 100 which enables the user's operation. The information processing apparatus 100 includes the operation unit 108, thereby enabling the user's operation and performing a user-desired processing in response to the user's operation. The operation unit 108 includes but is not limited to a rotary selector such as button, directional key or jog dial, or a combination thereof.

The display unit 110 is a display means provided in the information processing apparatus 100 and displays various items of information on the display screen. The screen to be displayed on the display screen of the display unit 110 includes the execution screen of the operation applications as shown in FIGS. 2, 4 and 9, the execution screen of other applications, and other operation screen for causing the information processing apparatus 100 to perform a desired operation, for example. The display unit 110 includes but is not limited to LCD or organic EL display. For example, the display unit 110 can be configured with a touch screen in the information processing apparatus 100, for example. In the above case, the display unit 110 functions as the operation display unit capable of both of the user's operation and the displaying.

The information processing apparatus 100 can realize the processings for the convenience improving approach with the configuration shown in FIG. 13, for example.

Of course, the configuration of the information processing apparatus according to the embodiment of the present invention is not limited to the configuration shown in FIG. 13. For example, the information processing apparatus according to the embodiment of the present invention can display various screens on the display screen of the display device as an external device without including the display unit 110 shown in FIG. 13. Further, even when including the display unit 110 shown in FIG. 13, the information processing apparatus according to the embodiment of the present invention can display various screens on the display screen of the display device as an external device.

[Information Providing Server 200]

Figure 15:
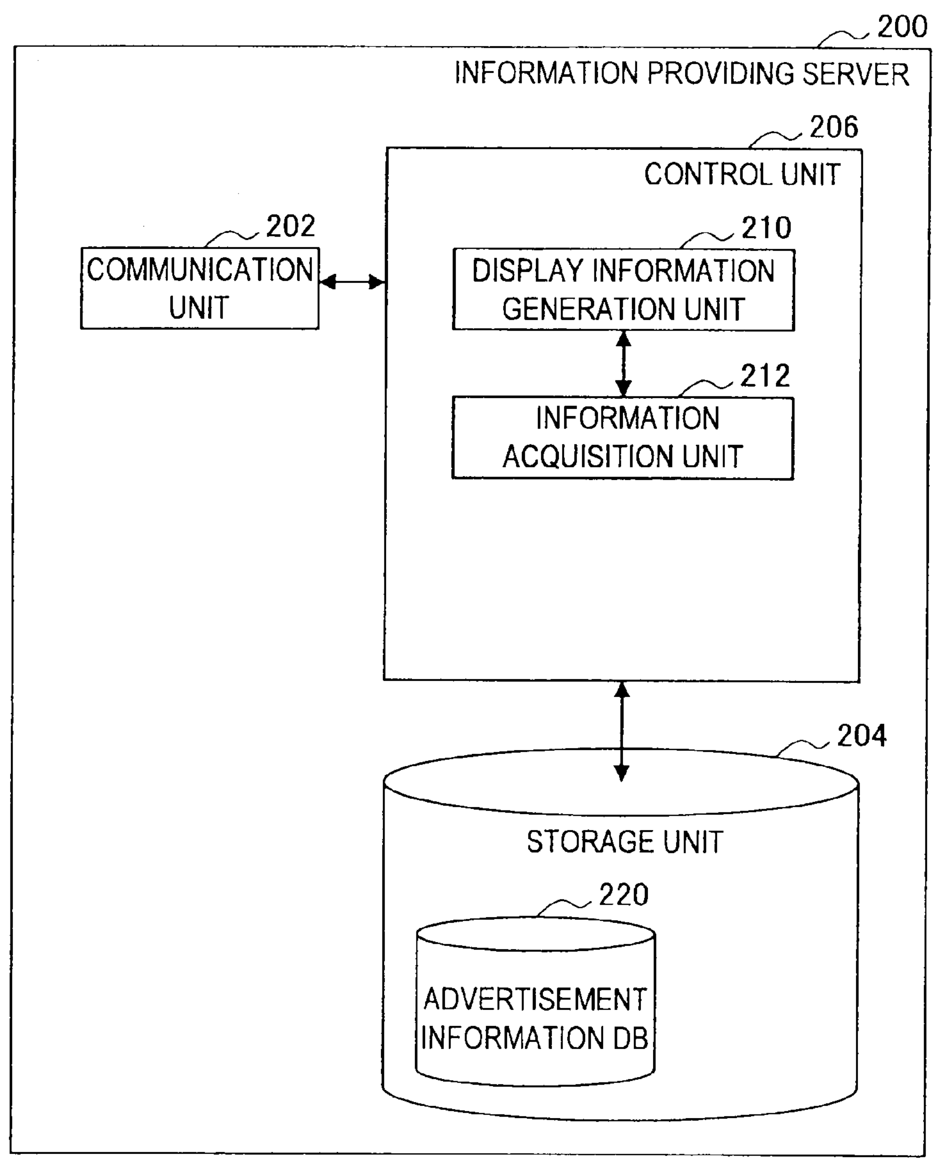
FIG. 15 is an explanatory diagram showing one example of a configuration of an information providing server according to the embodiment of the present invention.

The configuration example of the information providing server 200 constituting the information processing system 1000 will be described below. FIG. 15 is an explanatory diagram showing one example of the configuration of the information providing server 200 according to the embodiment of the present invention. The information providing server 200 includes a communication unit 202 (server side communication unit), a storage unit 204 and a control unit 206.

The information providing server 200 may include a ROM (not shown), a RAM (not shown), an operation unit (not shown) operable by a manager of the information providing server 200, a display unit (not shown) for displaying various screens on a display screen, and the like, for example. The information providing server 200 connects the respective components via a bus as a data transmission path, for example.

The ROM (not shown) stores therein programs to be used by the control unit 206 or control data such as operation parameters. The RAM (not shown) temporarily stores therein programs to be executed by the control unit 206. The operation unit (not shown) includes a device similar to the operation input device 160 in the aforementioned information processing apparatus 100, for example. The display unit (not shown) includes a device similar to the display device 162 in the aforementioned information processing apparatus 100, for example.

[Hardware Configuration Example of Information Providing Server 200]

The information providing server 200 has a hardware configuration similar to the information processing apparatus 100 shown in FIG. 14, for example. With the above configuration, the MPU serves as the control unit 206 and the recording medium serves as the storage unit 204 in the information providing server 200. Further, with the above configuration, the communication interface serves as the communication unit 202 in the information providing server 200. Of course, the configuration of the information providing server 200 according to the embodiment of the present invention is not limited to the similar configuration to the information processing apparatus 100 shown in FIG. 14.

The communication unit 202 is a communication means provided in the information providing server 200, and makes a wired/wireless communication with an external device such as each information processing apparatus constituting the information processing system 1000 via the network 300 (or directly). The communication unit 202 is controlled in its communication by the control unit 206, for example.

The communication unit 202 includes but is not limited to communication antenna and RF circuit, LAN terminal and exchange circuit, and the like, for example. For example, the communication unit 202 may have an arbitrary configuration communicable with an external device via the network 300.

The storage unit 204 is a storage means provided in the information providing server 200. The storage unit 204 includes but is not limited to a magnetic recording medium such as hard disk or a nonvolatile memory such as flash memory.

The storage unit 204 stores therein various items of data such as advertisement information DB or applications. FIG. 15 shows the example in which an advertisement information DB 220 is stored in the storage unit 204, but the storage unit 204 is not limited thereto.

The control unit 206 is configured with a MPU or an integrated circuit in which various processing circuits are integrated, for example, and serves to entirely control the information providing server 200. The control unit 206 includes a display information generation unit 210 and an information acquisition unit 212 and serves to generate the display information based on the preference information received by the communication unit 202 and to transmit the generated display information to the information processing apparatus which has transmitted the preference information.

The display information generation unit 210 generates the display information depending on the preference information based on the preference information received by the communication unit 202 and a request of generating the display information.

The display information generation unit 210 generates the display information based on the received preference information and various items of data such as the advertisement information DB 220 stored in the storage unit 204, but is not limited thereto. For example, the display information generation unit 210 can acquire the information matching with the preference information from an external device in association with the information acquisition unit 212 and generate the display information based on the acquired information. Further, for example, when the information received by the communication unit 202 includes the identification information and/or the area information, the display information generation unit 210 generates the display information based on the received identification information and/or area information (the display information matching with the identification information and/or area information).

Then, the display information generation unit 210 transmits the generated display information to the information processing apparatus which has transmitted the preference information. The display information generation unit 210 uniquely specifies the information processing apparatus which has transmitted the preference information based on the information (such as IP (Internet Protocol) address or MAC (Media Access Control) address) for specifying the information processing apparatus, which is contained in the request of generating the display information transmitted from the information processing apparatus together with the preference information.

The information acquisition unit 212 acquires the information corresponding to the preference information from an external device via the communication unit 202 based on the information acquiring request of requesting to acquire the information based on the preference information, which is transmitted from the display information generation unit 210. Then, the information acquisition unit 212 transmits the acquired information to the display information generation unit 210. The information to be acquired by the information acquisition unit 212 includes but is not limited to content information over the cloud computing service, which is retrieved based on the preference information, for example.

The control unit 206 includes the display information generation unit 210 and the information acquisition unit 212, for example, thereby generating the display information based on the preference information received by the communication unit 202 and serving to transmit the generated display information to the information processing apparatus which has transmitted the preference information.

The information providing server 200 can generate the display information based on the preference information transmitted from each information processing apparatus 100 constituting the information processing system 1000 and transmit the display information to the information processing apparatus as transmission source with the configuration shown in FIG. 15, for example. Of course, the configuration of the information providing server according to the embodiment of the present invention is not limited to the configuration shown in FIG. 15.

As described above, the information processing system 1000 according to the embodiment of the present invention has the information processing apparatus 100 and the information providing server 200. The information processing apparatus 100 provides the display information to the user via the operation for displaying the first operation screen B and the second operation screen A on the display screen. The operation application according to the embodiment of the present invention has an application launcher function and an information notification function, thereby realizing the provision of the display information and the execution of the processings in response to the user's operation.

The display information according to the embodiment of the present invention is generated in the information processing apparatus 100 and/or the information providing server 200 based on the preference information, for example. In other words, since the display information generated as described above is based on the user's preference, the information can attract the user, which further matches with the user's preference. The information processing apparatus 100 can notify the user of the display information (information important for the user) which is desirably notified to the user even if it is not necessarily based on the user's preference, such as a message indicating an alert (one example of the application message). The above display information has a high possibility of attracting the user even if it is not based on the user's preference. Further, the information processing apparatus 100 can use the history of the user's selecting operation on the first operation screen B or the user's operation such as the display information selecting operation on the second operation screen A for analyzing the user's preference. Thus, since the information processing apparatus 100 can provide the display information with higher accuracy, which is based on the user's preference, over time, the display information capable of more attracting the user can be provided to the user.

Therefore, the information processing apparatus 100 can provide the information capable of attracting the user to the user and improve the user's convenience when the user is attracted by the provided information.

The information processing apparatus 100 has been described above as one component constituting the information processing system 1000 according to the embodiment of the present invention, but the embodiment of the present invention is not limited to the configuration. The embodiment of the present invention is applicable to various devices including computer such as PC or PDA (Personal Digital Assistant), portable communication device such as cell phone or PHS (Personal Handyphone System), video/music reproducing apparatus, video/music recording/reproducing apparatus or portable game player.

The information providing server 200 has been described above as one component constituting the information processing system 1000 according to the embodiment of the present invention, but the embodiment of the present invention is not limited to the configuration. The embodiment of the present invention is applicable to various devices including computers such as server or PC.

(Program According to the Embodiment of the Present Invention)

With a program for causing a computer to function as the information processing apparatus according to the embodiment of the present invention, the information capable of attracting the user can be provided to the user and the user's convenience can be improved when the user is attracted by the provided information.

With a program for causing a computer to function as the information providing server according to the embodiment of the present invention, the display information based on the received preference information can be generated and the generated display information can be transmitted to the transmission source apparatus of the preference information. Thus, with the program for causing a computer to function as the information providing server according to the embodiment of the present invention, there can be realized the information processing system which can provide the information capable of attracting the user to the user and improve the user's convenience when the user is attracted by the provided information.

It should be understood by those skilled in the art that various modifications, combinations, sub-combinations and alterations may occur depending on design requirements and other factors insofar as they are within the scope of the appended claims or the equivalents thereof.

There has been described the configuration in which the control unit 106 includes the preference information generation unit 112, the status determination unit 114, the display control unit 116, the display information displaying control unit 118, the display information acquisition unit 120 and the processing unit 122 in the information processing apparatus 100 shown in FIG. 13, for example, but the configuration of the information processing apparatus according to the embodiment of the present invention is not limited to the above. For example, the information processing apparatus according to the embodiment of the present invention can individually include the arbitrary components such as the preference information generation unit 112, the status determination unit 114, the display control unit 116, the display information displaying control unit 118, the display information acquisition unit 120 and the processing unit 122 shown in FIG. 13 (for example, realize the units by individual processing circuits, respectively).

For example, there is shown the configuration in which the control unit 206 includes the display information generation unit 210 and the information acquisition unit 212 in the information providing server 200 shown in FIG. 15, but the configuration of the information providing server according to the embodiment of the present invention is not limited to the above. For example, the information providing server according to the embodiment of the present invention can individually include the display information generation unit 210 and the information acquisition unit 212 shown in FIG. 15 (for example, realize the units by individual processing circuits, respectively).

There has been described above that the program (computer program) for causing a computer to function as the information processing apparatus and the information providing server according to the embodiment of the present invention, respectively, is provided, but the embodiment of the present invention can provide a storage medium storing therein the program.

The aforementioned configuration shows one example of the embodiment of the present invention and falls within the technical scope of the present invention.

The present application contains subject matter related to that disclosed in Japanese Priority Patent Application JP 2009-200757 filed in the Japan Patent Office on Aug. 31, 2009, the entire content of which is hereby incorporated by reference.

What is claimed is:

1. An information processing apparatus, comprising:

circuitry configured to:

generate user preference information based on a first user operation;

detect a first status of an operation application, wherein the first status of the operation application corresponds to display of a first operation screen on a display device;

change the first status of the operation application to a second status, based on a second user operation, wherein the second status of the operation application corresponds to display of a second operation screen on the display device, and wherein the second operation screen is overlaid on a portion of the first operation screen such that a display line separates the first operation screen and the second operation screen;

control, based on the user preference information, the display device to display first information on the first operation screen; and control, based on the user preference information, the display device to display a plurality of icons on the second operation screen, wherein the plurality of icons corresponds to first applications that are registered in the operation application, and wherein the first applications are executable through a selection operation of the plurality of icons.

2. The information processing apparatus according to claim 1, wherein the circuitry is further configured to:

control the display device to display the display line under the displayed plurality of icons on the second operation screen, deform a part of the display line that is under one of the plurality of icons, based on a first distance between an operation position and the one of the plurality of icons that is equal to or less than a second distance; and restore a shape of the part of the display line, based on the first distance between the operation position and the one of the plurality of icons that is larger than the second distance.

3. The information processing apparatus according to claim 1, wherein the circuitry is further configured to control the display device to display the second operation screen as a part of the first operation screen.

4. The information processing apparatus according to claim 1, wherein the operation application is a launcher application to execute at least one of the first applications.

5. The information processing apparatus according to claim 1, wherein the circuitry is further configured to:

store the user preference information, advertisement information, and content data;

generate the first information based on the user preference information, the advertisement information, and the content data; and control the display device to display the generated first information on the first operation screen.

6. The information processing apparatus according to claim 5, wherein the circuitry is further configured to:

communicate with an information providing server;

transmit the user preference information to the information providing server, wherein the information providing server generates second information that matches with the user preference information;

acquire, from the information providing server, the second information; and control the display device to display at least one of the generated first information or the acquired second information on the first operation screen.

7. The information processing apparatus according to claim 1, wherein the circuitry is further configured to:

communicate with an information providing server;

transmit the user preference information to the information providing server, wherein the information providing server generates second information that matches with the user preference information;

acquire, from the information providing server, the second information; and control the display device to display the acquired second information on the first operation screen.

8. The information processing apparatus according to claim 1, wherein the circuitry is further configured to:

analyze a plurality of selection operations to execute the first applications; and display the plurality of icons based on the analyzed plurality of selection operations.

9. The information processing apparatus according to claim 1, wherein the circuitry is further configured to:

determine a time instance of display of the first information, based on the user preference information; and control the display device to display the first information on the first operation screen at the time instance.

10. The information processing apparatus according to claim 1, wherein the circuitry is further configured to:

execute one of the first applications based on a selection of the one of the first applications on the second operation screen.

11. The information processing apparatus according to claim 1, wherein the first operation screen has a first shape, wherein the first shape includes a concave portion, wherein the circuitry is further configured to control the display device to display the first operation screen to elastically deform to a second shape, and wherein in the elastic deformation of the first operation screen, the concave portion is projected towards an operation position based on a third distance between the operation position and the first operation screen that is equal to or less than a second distance.

12. The information processing apparatus according to claim 1, wherein the circuitry is further configured to:

control, movement of the first operation screen between a first position on the display device to a second position on the display device, based on an operation position, wherein a fourth distance between the operation position and the second operation screen on the display device is equal to or less than a second distance, and wherein the plurality of icons on the second operation screen moves based on the movement of the first operation screen from the first position on the display device to the second position on the display device.

13. An information processing apparatus, comprising:

circuitry configured to:

generate user preference information based on a first user operation;

acquire, from an information providing server, first information that matches with the user preference information;

detect a first status of an operation application, wherein the first status of the operation application corresponds to display of a first operation screen on a display device;

change the first status of the operation application to a second status, based on a second user operation, wherein the second status of the operation application corresponds to display of a second operation screen on the display device, and wherein the second operation screen is overlaid on a portion of the first operation screen such that a display line separates the first operation screen and the second operation screen;

control, based on the user preference information, the display device to display the first information on the first operation screen; and control, based on the user preference information, the display device to display a plurality of icons on the second operation screen, wherein the plurality of icons corresponds to first applications that are registered in the operation application, and wherein the first applications are executable through a selection operation of the plurality of icons.

14. The information processing apparatus according to claim 13, wherein the circuitry is further configured to:

display a pointer that moves based on the second user operation; and change a display position of the first operation screen based on an amount of movement of the pointer towards the first operation screen.

15. A non-transitory computer-readable medium having stored thereon, computer-executable instructions for causing a computer to execute operations, the operations comprising:

generating user preference information based on a first user operation;

detecting first status of an operation application, wherein the first status of the operation application corresponds to display of a first operation screen on a display device;

changing the first status of the operation application to a second status based on a second user operation, wherein the second status of the operation application corresponds to display of a second operation screen on the display device, and wherein the second operation screen is overlaid on a portion of the first operation screen such that a display line separates the first operation screen and the second operation screen;

controlling, based on the user preference information, the display device to first information on the first operation screen; and controlling, based on the user preference information, the display device to display a plurality of icons on the second operation screen, wherein the plurality of icons corresponds to first applications that are registered in the operation application, and wherein the first applications are executable through a selection operation of the plurality of icons.

16. An information processing system, comprising:

an information processing apparatus; and an information providing server configured to communicate with the information processing apparatus, wherein the information processing apparatus comprises first circuitry configured to:

generate user preference information based on a first user operation;

store the user preference information, advertisement information, and content data;

acquire, from the information providing server, first information that matches with the user preference information;

detect first status of an operation application, wherein the first status of the operation application corresponds to display of a first operation screen on a display device;

change the first status of the operation application to a second status based on a second user operation, wherein the second status of the operation application corresponds to display of a second operation screen on the display device, and wherein the second operation screen is overlaid on a portion of the first operation screen such that a display line separates the first operation screen and the second operation screen;

control, based on the user preference information, the display device to display one of the first information, advertisement information, or the content data on the first operation screen;

control, based on the user preference information, the display device to display a plurality of icons on the second operation screen, wherein the plurality of icons corresponds to first applications that are registered in the operation application, and wherein the first applications are executable through a selection operation of the plurality of icons; and the information providing server comprises second circuitry configured to:

receive, from the information processing apparatus, the user preference information;

generate the first information based on the user preference information such that the generated first information matches with the user preference information; and transmit the generated first information to the information processing apparatus.

* * * * *